(12) United States Patent　(10) Patent No.: US 7,864,179 B1
Acquavella　(45) Date of Patent: Jan. 4, 2011

(54) FRACTIONAL PARAMETRIC POLYSTAR METHODS AND APPARATUS

(75) Inventor: James Acquavella, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 886 days.

(21) Appl. No.: 11/786,884

(22) Filed: Apr. 13, 2007

(51) Int. Cl.
　G06T 11/20　(2006.01)
　G09G 5/00　(2006.01)

(52) U.S. Cl. .................. 345/441; 345/442; 345/443; 345/619

(58) Field of Classification Search ........... 345/420, 345/619, 441–443
　See application file for complete search history.

(56) References Cited

U.S. PATENT DOCUMENTS 5,471,568 A * 11/1995 Webb et al. .................. 345/443
5,818,458 A * 10/1998 Saito ........................... 345/441
2007/0188489 A1 * 8/2007 Lalvani ....................... 345/420

* cited by examiner

*Primary Examiner*—Chante Harrison
(74) *Attorney, Agent, or Firm*—Schwegman Lundberg & Woessner, P.A.

(57) ABSTRACT

Methods and apparatus disclosed herein receive a non-integer star points input parameter value, create a star shape with a number of star points equal to an integer portion of the star points input parameter plus one, and store or render the star shape to an output device. A fractional star point is differentiated from integer star points by a differential radial length between the two. Some embodiments also receive a non-integer polygon sides input parameter value and render a modified polygon shape with a total number of sides equal to an integer portion of the polygon sides input parameter plus one. A number of sides equal to the integer portion of the polygon sides parameter minus one are rendered as regular polygon sides. Two sides are rendered as adjacent symmetrical bezier curves, and the modified polygon shape is stored or rendered to an output device.

30 Claims, 20 Drawing Sheets

FRACTIONAL PARAMETRIC POLYSTAR METHODS AND APPARATUS

TECHNICAL FIELD

Various embodiments described herein relate to methods and apparatus associated with computer graphics and animation primitives, including polygon and star shapes.

BACKGROUND INFORMATION

Modern computer graphics systems may include drawing programs, computer-aided design programs, photographic image manipulation routines, video editing software, gaming software, and others. Such programs may assist the user in developing complex graphics objects by generating graphics primitives. Such primitives may include lines, rectangles, circles, ellipses, and even more complex shapes. A graphics program may interact with the user via a "drag and drop" interface or other means to receive user input as to a size, a location, or a shape of a requested primitive. The user may then combine a set of primitives created with assistance from the graphics program into a more complex graphic object.

The increasing demand for graphics output has established a need for quick and accurate creation of ever more complex graphics primitives.

DETAILED DESCRIPTION

Embodiments herein create, store, and render fractional star and polygon primitives in response to parametric user input. Examples of the various embodiments depicted and discussed show star shapes with a selected small number of star points and polygons with a selected small number of sides. Example values of other parameters including radii and roundness parameters are also used in the star and polygon shapes depicted and described herein. These example values are used to present a clear, simplified explanation. The invented embodiments include a full range of values for any input parameter described in conjunction with the embodiments disclosed herein.

Figure 1:
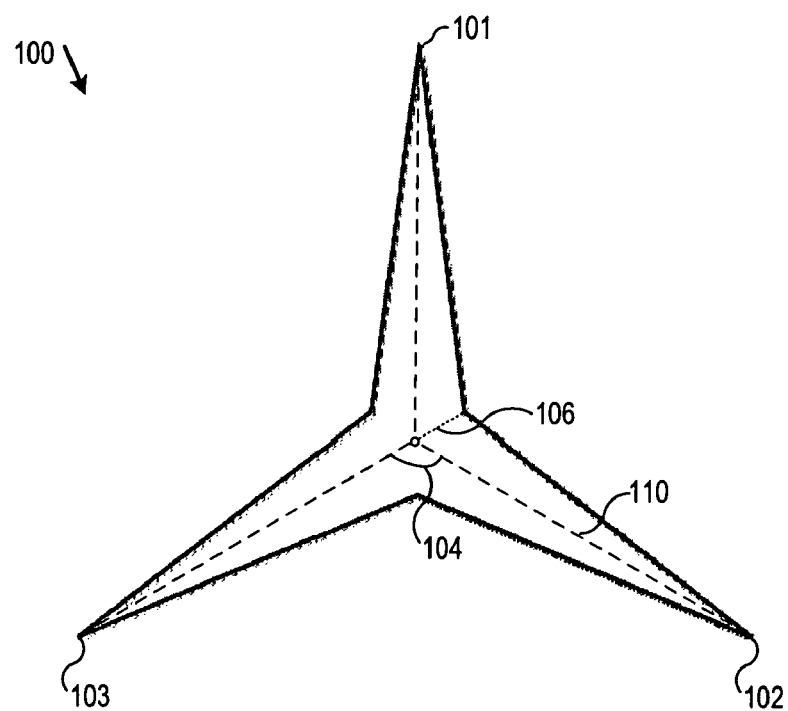
FIG. 1 is a diagram of a prior art star shape 100.

FIG. 1 is a diagram of a prior art star shape 100. The star shape 100 has three star points 101, 102, and 103. An angle 104 between adjacent points is calculated by dividing 360 degrees by the number of points. In the particular case of the three star point star shape 100, the angle between adjacent points is 360/3=120 degrees. An inner radius 106 and an outer radius 110 are associated with the star shape 100.

Figure 2:
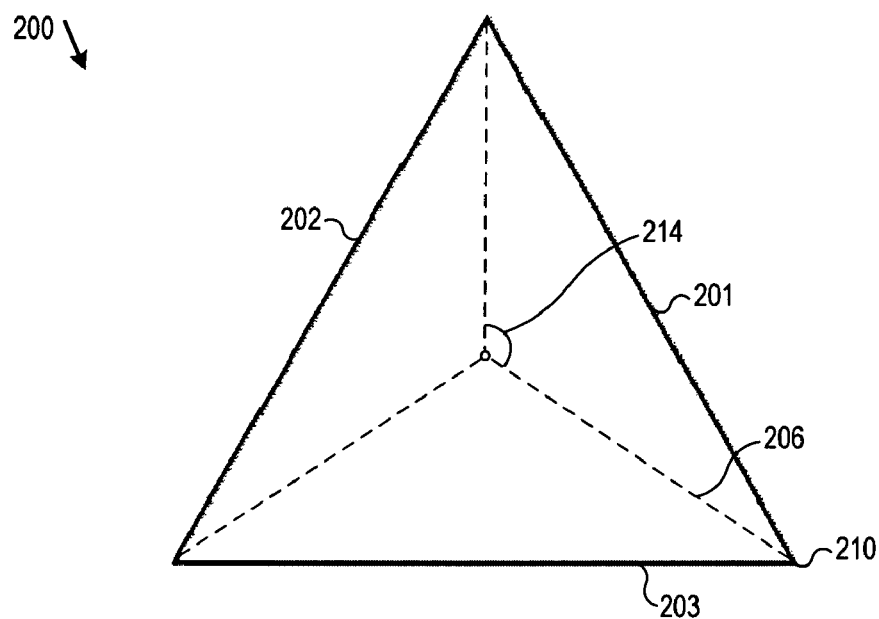
FIG. 2 is a diagram of a prior art polygon shape 200.

FIG. 2 is a diagram of a prior art polygon shape 200. The polygon shape 200 has three sides 201, 202, and 203, and is thus a triangle. A radius 206 associated with the polygon shape 200 traverses a path from the center of the polygon shape 200 to any vertex (e.g., the vertex 210). An angle 214 is formed between adjacent radii. The angle 214 is calculated by dividing 360 degrees by the number of vertices. In the particular case of the triangular polygon shape 200, the angle 214 is 360/3=120 degrees.

Figure 3:
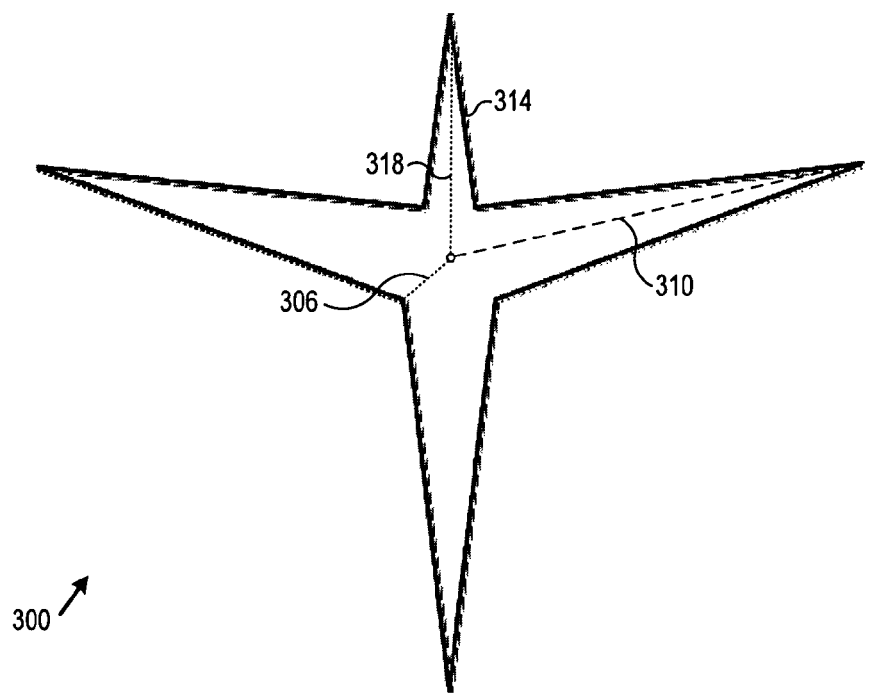
FIGS. 3-18 are diagrams of star shapes according to various embodiments disclosed herein.

FIG. 3 is a diagram of a star shape 300 according to various embodiments disclosed herein. Various embodiments render the star shape 300 substantially as shown in response to a star points input parameter of 3.5, an inner radius input parameter of 30 pixels, and an outer radius input parameter of 215 pixels. That is, the star shape 300 is rendered with an inner radius 306 of 30 pixels, and an outer radius 310 of 215 pixels. Embodiments herein render the partial star point 314 with a radius 318 that is proportional to the fractional portion of the star points input parameter (e.g., 0.5 in the case of the star shape 300).

Figure 4:
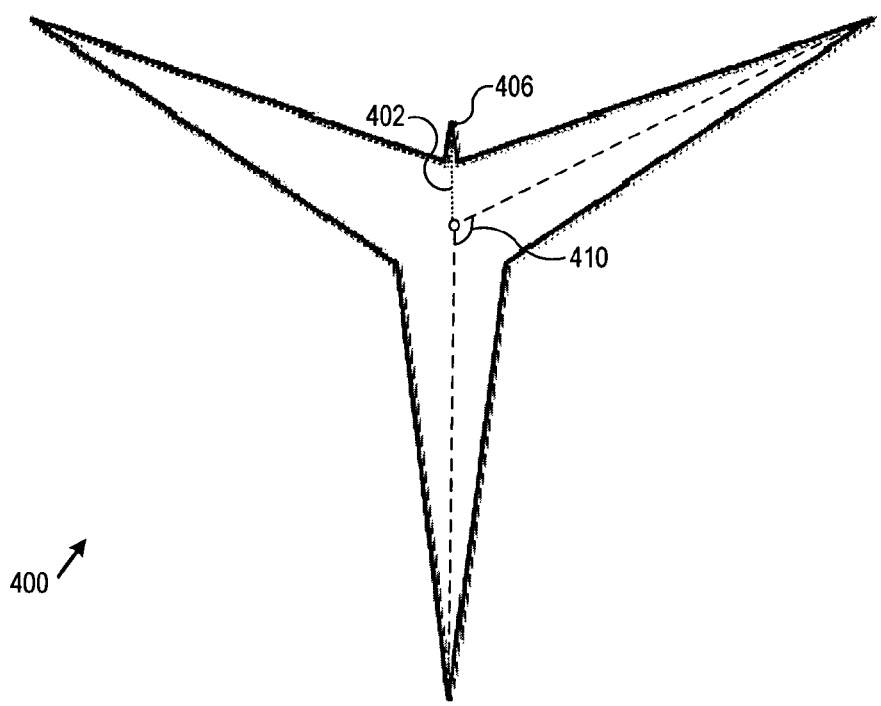

FIG. 4 is a diagram of a star shape 400 according to various embodiments disclosed herein. The star points input parameter used to render the star shape 400 is 3.1, while the inner and outer radius input parameters remain the same as defined for the star shape 300. The reader is invited to note that the radius 402 associated with the partial star point 406 is reduced proportionally to the fractional portion 0.1 of the star points input parameter value of 3.1. Various embodiments herein render an angle 410 between adjacent radii associated with integer star points to be inversely proportional to the fractional portion of the star points input parameter.

Figure 5:
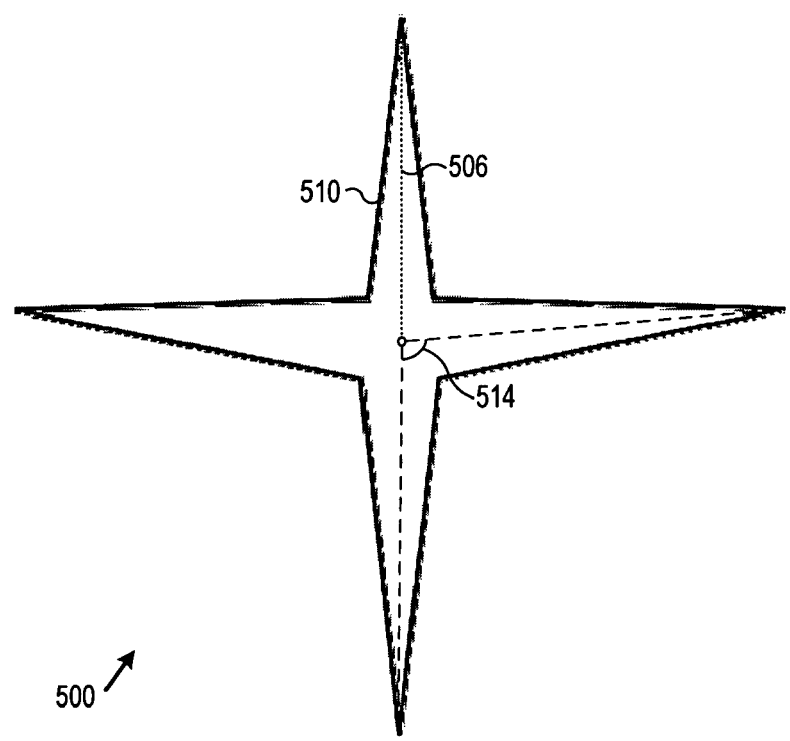

FIG. 5 is a diagram of a star shape 500 according to various embodiments disclosed herein. The star points input parameter associated with the star shape 500 is 3.8, with all other input parameters constant as compared to FIGS. 3 and 4. The reader is invited to note that the radius 506 associated with the partial star point 510 is larger than that of the star shape 400 and is proportional to the fractional portion 0.8 of the star points input parameter. The angle 514 between integer star point radii is smaller than that of the star shape 400 and is inversely proportional to the fractional portion 0.8 of the star points input parameter.

Figure 6:
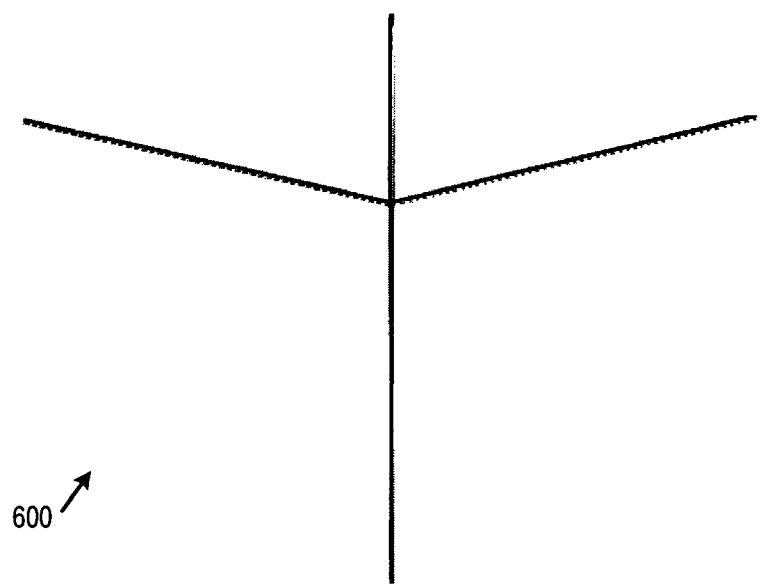

FIG. 6 is a diagram of a star shape 600 according to various embodiments disclosed herein. The star points input parameter associated with the star shape 500 is 3.5, and the inner radius input parameter is set to zero. Thus it can be seen that the star points may reduce to lines if an inner radius is set to zero and a roundness input parameter is set to zero as described further below.

Figure 7:
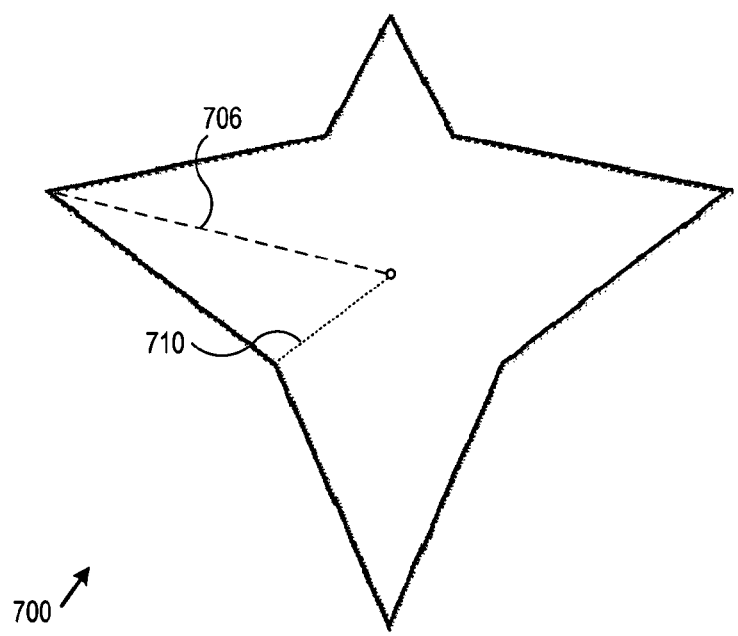

FIG. 7 is a diagram of a star shape 700 according to various embodiments disclosed herein. The outer radius 706 is held constant at 215 as with the star shapes 300, 400, 500, and 600, while the inner radius 710 is increased from 30 to 90. The breadth of the star shape 700 is seen to have increased with the increase of the inner radius input parameter.

Figure 8:
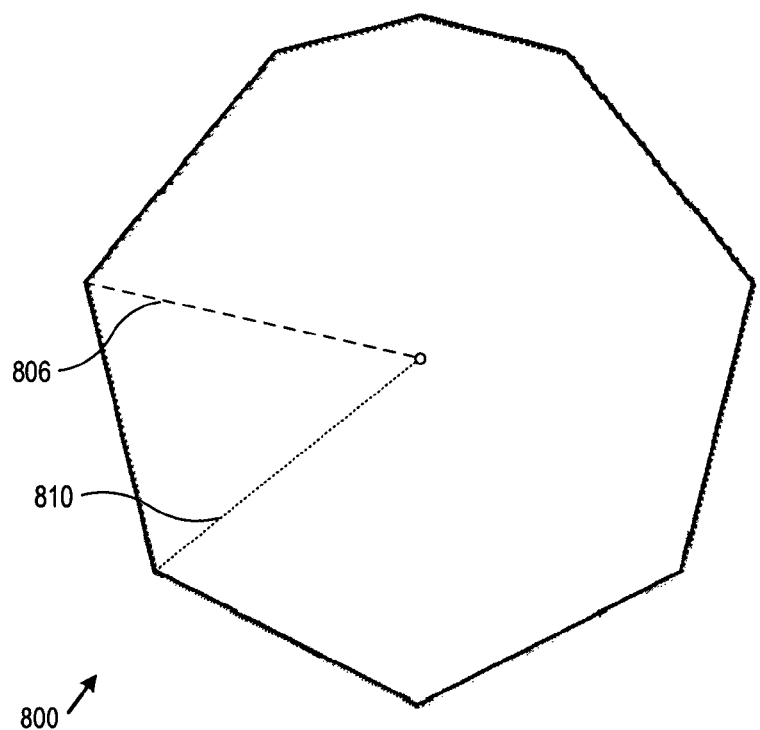

FIG. 8 is a diagram of a star shape 800 according to various embodiments disclosed herein. The outer radius 806 of the star shape 800 is held constant at 215, while the inner radius 810 is increased to 200, a value close to the magnitude of the outer radius 806. The star shape 800 assumes a polygon-like shape using these input parameters.

Figure 9:
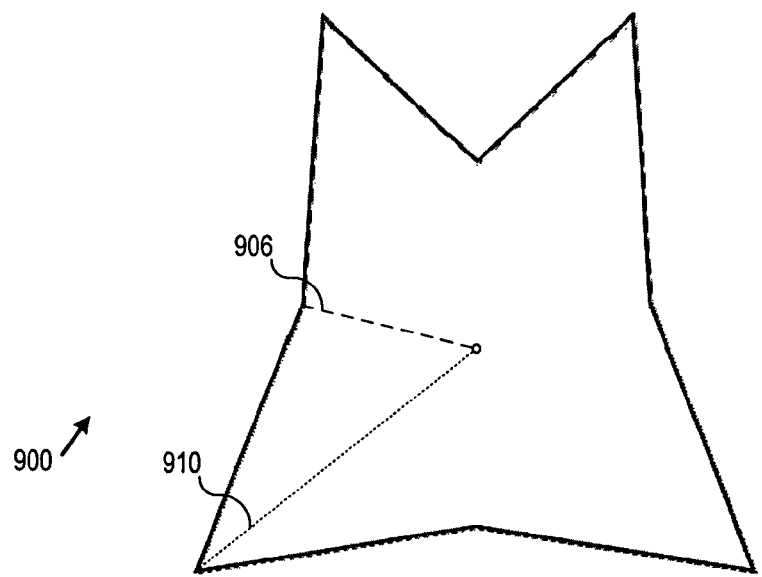

FIG. 9 is a diagram of a star shape 900 according to various embodiments disclosed herein. The outer radius 906 of the star shape 900 is held constant at 215, while the inner radius 910 is increased to 250. The condition of the inner radius 910 being greater than the outer radius 906 produces the polygon of the star shape 900. The star points appear as depressions into the body of the star shape 900 rather than as extensions from the body.

FIGS. 10, 10A, 10B, 10C, and 10D are diagrams of a star shape 1000 and various components thereof according to embodiments disclosed herein. The star shape 1000 is rendered with one or more lobe-shaped star points (e.g., the star points 1006, 1008, and 1012) according to an outer roundness input parameter, the latter expressed as a percent. The breadth of the lobe-shaped star point 1012 perpendicular to the radial axis 1032 is proportional to the magnitude of the outer roundness input parameter. The outer roundness input parameter associated with the star shape 1000 is 100%. The shape of a lobed star point with a 100% outer roundness input parameter approximates a circle (e.g., the circle 1048 drawn inside the star shape 1000) at the outer extreme of the lobed star point.

Figure 10:
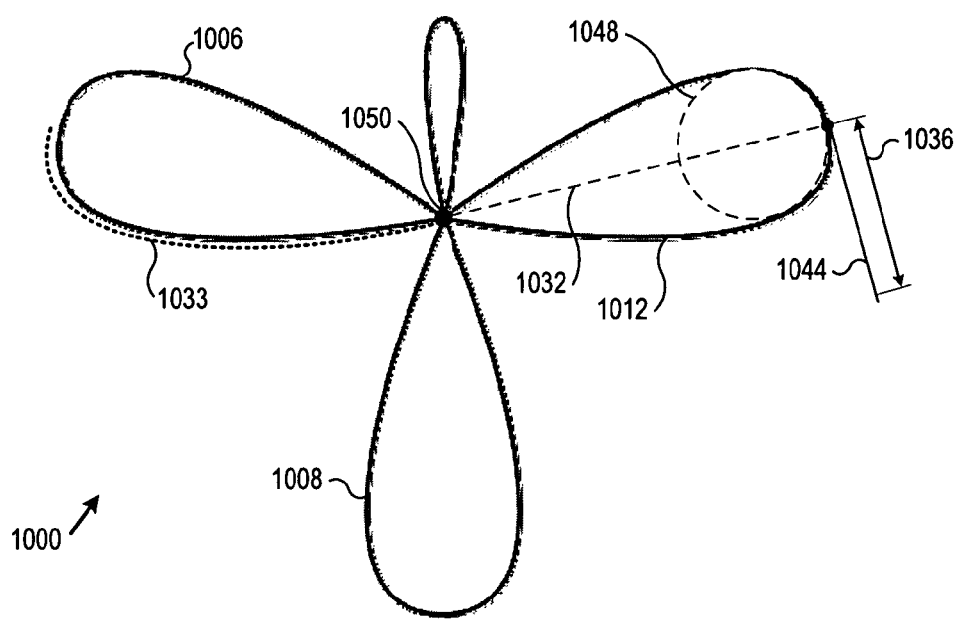
Figure 10A:
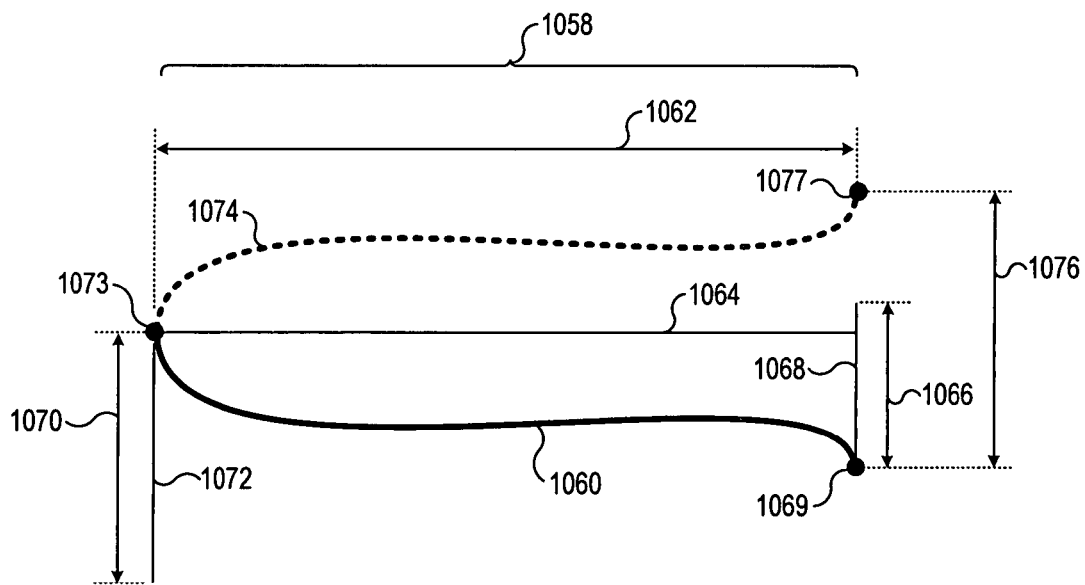

Turning to FIG. 10A, a lobed star point 1058 may comprise a bezier curve 1060 and a bezier curve 1074. The lobed star point 1058 has a length 1062 corresponding to a radius 1064. The form of the bezier curve 1060 is determined by a length 1066 of a tangent line 1068 at an endpoint 1069 and by a length 1070 of a tangent line 1072 at an endpoint 1073. Some embodiments may combine the second bezier curve 1074, symmetrical about the axis 1064 with the bezier curve 1060, to form the lobe-shaped star point 1058.

The length 1070 of the tangent 1072 at the outer endpoint 1073 determines the breadth of the lobe at the outer radius. This breadth is referred to herein as the outer roundness. The length 1066 of the tangent 1068 defines a parameter referred to herein as the inner roundness. The inner roundness parameter and its effect on a star shape are discussed further below. A distance 1076 between endpoints 1069 and 1077 of the two bezier curves at the base of the lobe is proportional to the inner radius of a star shape.

Figure 10B:
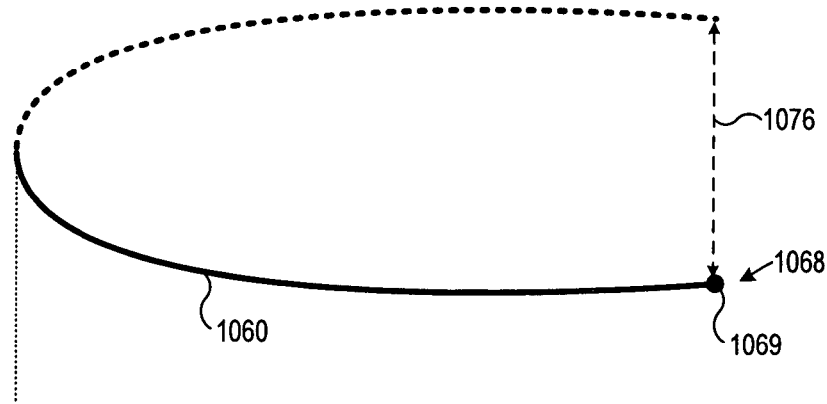
Figure 10C:
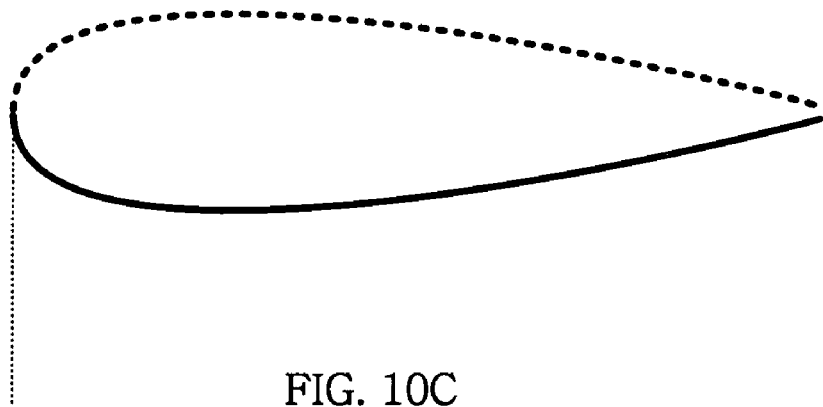
Figure 10D:
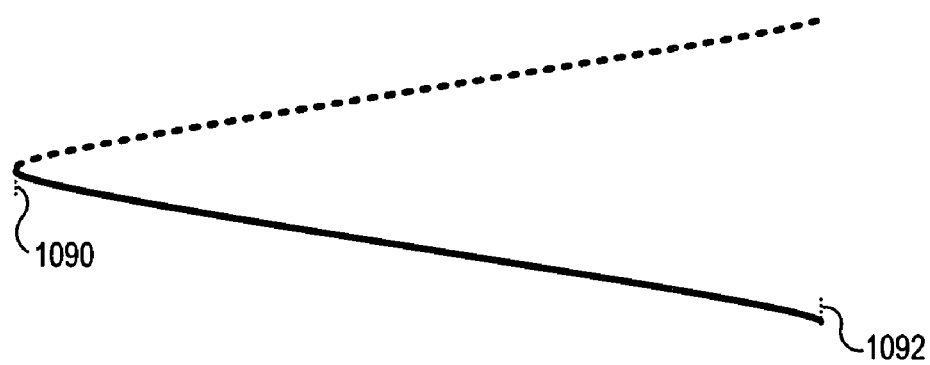

FIG. 10B demonstrates the effect of reducing the length of the tangent 1068 to zero. Curvature of the bezier curve 1060 is eliminated at the point 1069. Maintaining the FIG. 10B condition of a zero-length base tangent, FIG. 10C shows the effect on the lobe of reducing the base length 1076 to zero by reducing the inner radius to zero. A lobe similar to those of the star shape 1000 of FIG. 10 results. FIG. 10D shows that straight lines corresponding to the star points of the star shape 300 of FIG. 3 may be produced as the tangent line length of both inner and outer endpoints associated with both bezier curves is reduced to zero.

Turning back to FIG. 10, the dashed curve outline 1033 represents a bezier curve associated with the star point 1006, as previously described. Embodiments herein combine multiples of such curves to form the star shape 1000. An outer lobe shape corresponding to the outer roundness parameter is determined by the length 1036 of the tangent 1044. The lobes are straight as they enter the center point 1050, indicating that the inner tangents of the component bezier curves are of zero length. The zero-length inner tangents correspond to an inner roundness setting of zero percent.

Figure 11:
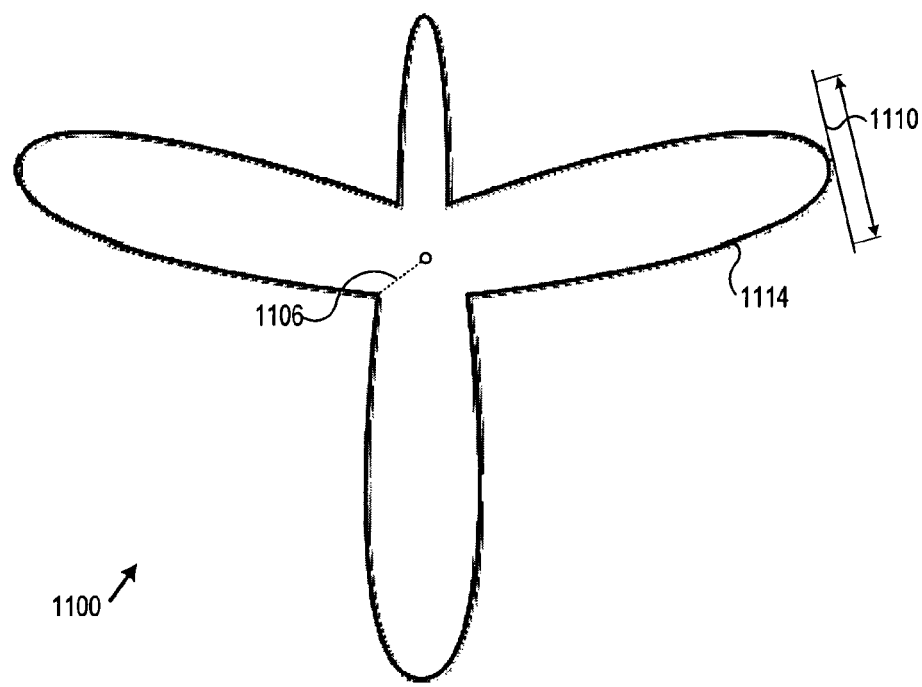

FIG. 11 is a diagram of a star shape 1100 according to various embodiments disclosed herein. The star shape 1100 is representative of a star shape with a non-zero outer roundness value and a non-zero inner radius value. The inner radius 1106 of the star shape 1100 is 30 pixels and the outer roundness value is 50%. The length of the tangent line 1110, combined from both bezier curves associated with the lobe, is proportional to the outer roundness value of 50% and determines the shape of the lobed star point 1114 at the outer radius.

Figure 12:
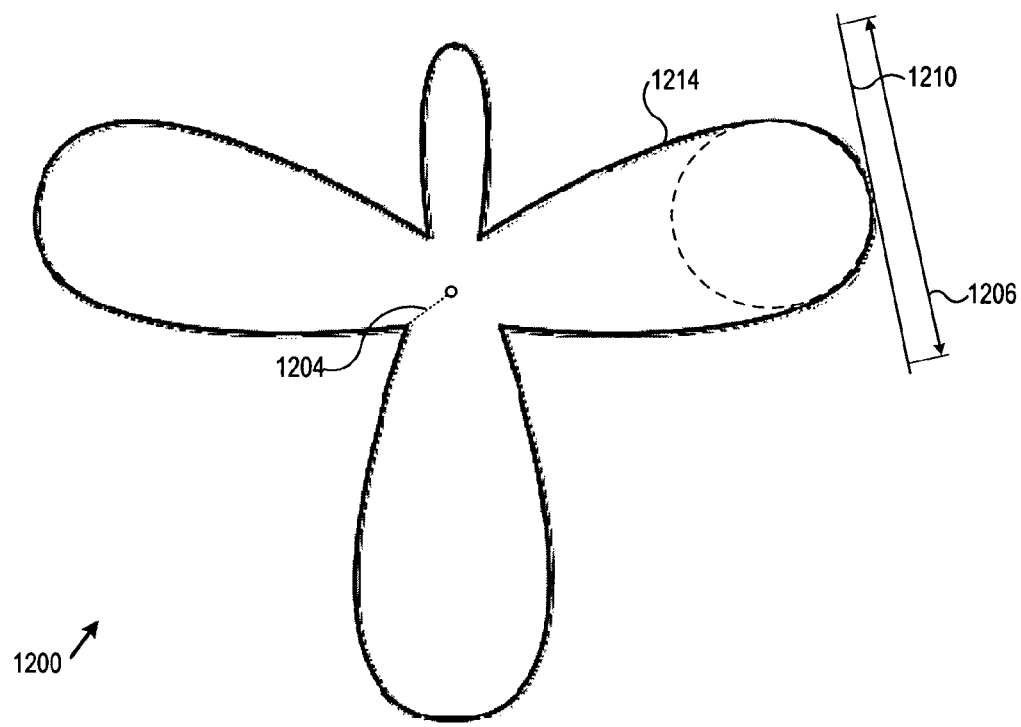

FIG. 12 is a diagram of a star shape 1200 according to various embodiments disclosed herein. The inner radius 1204 of the star shape 1200 is 30 pixels and the outer roundness value is 100%. The length 1206 of the tangent line 1210, combined from both bezier curves associated with the lobe, is proportional to the outer roundness value of 100%. The reader is invited to note that the tangent line 1210 is proportionally longer than the tangent line 1110 associated with the star shape 1100. Accordingly, the lobed star point 1214 associated with the star shape 1200 is proportionally broader than the lobed star point 1114 associated with the star shape 1100.

Figure 13:
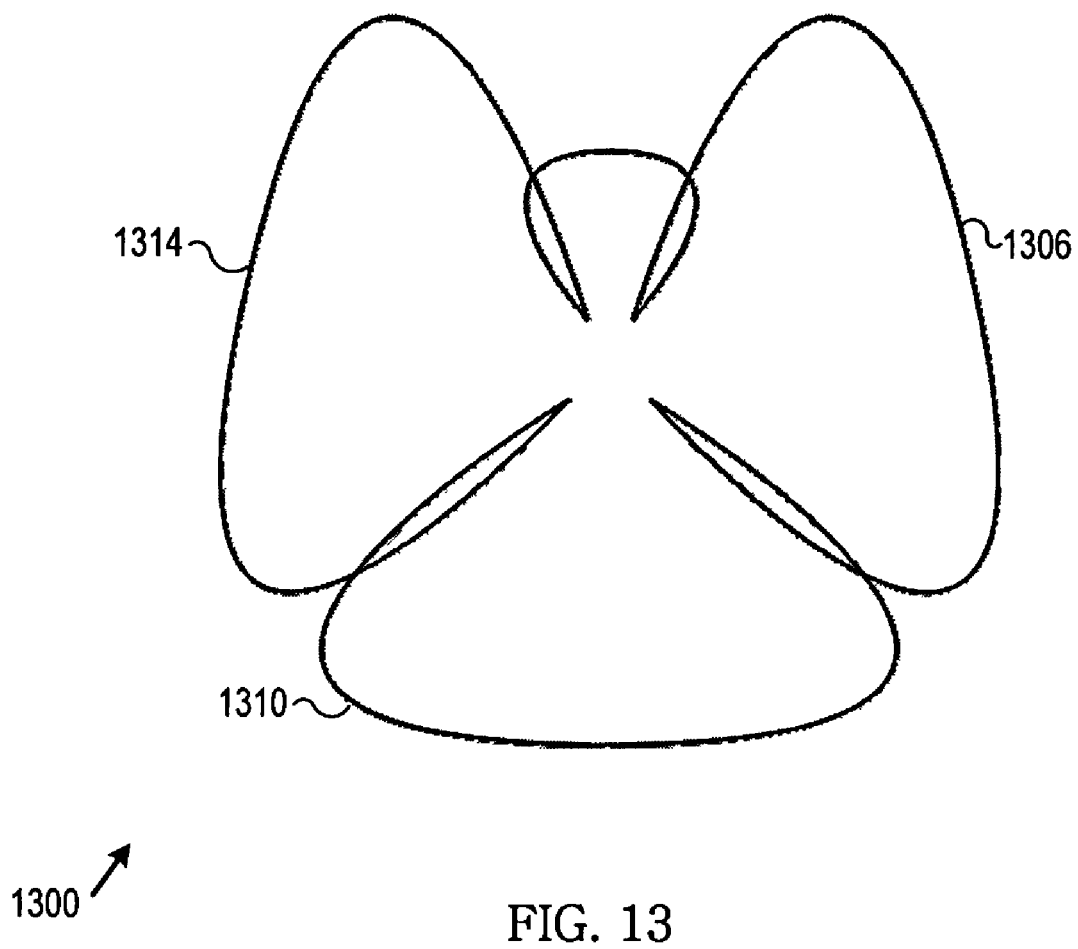

FIG. 13 is a diagram of a star shape 1300 according to various embodiments disclosed herein. The outer roundness value associated with the star shape 1300 is 400%. It can be seen that the lobed star points (e.g., the lobed star points 1306, 1310, and 1314 of the star shape 1300) associated with a star shape for which a large outer roundness value is specified may become so large as to cross over one another.

Figure 14:
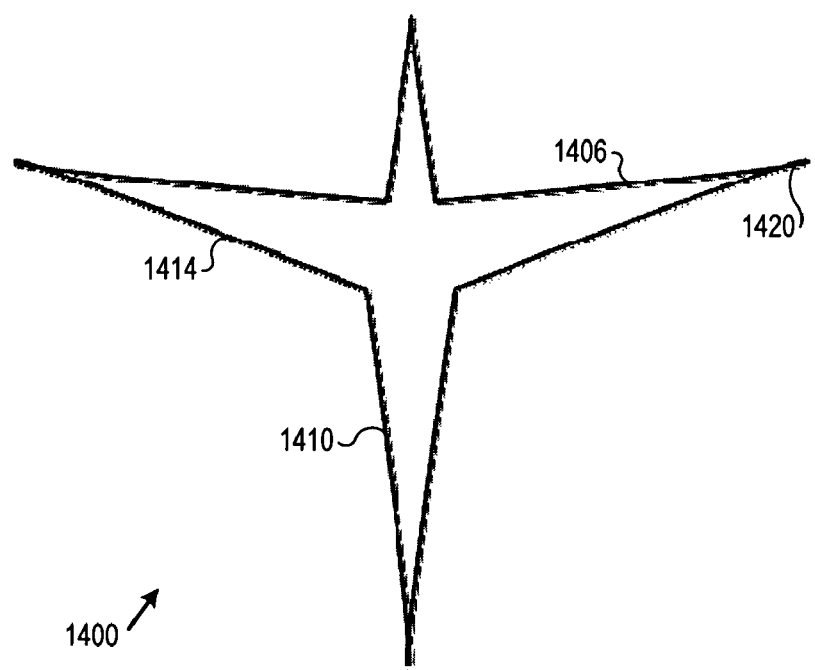

FIG. 14 is a diagram of a star shape 1400 according to various embodiments disclosed herein. The outer roundness value associated with the star shape 1400 is −5%. The sides of the star points (e.g., the star points 1406, 1410, and 1414 of the star shape 1400) associated with a star shape for which a small negative outer roundness value is specified begin to collapse toward one another at the extreme ends of the star points (e.g., the extreme end 1420 of the star point 1406 associated with the star shape 1400).

Figure 15:
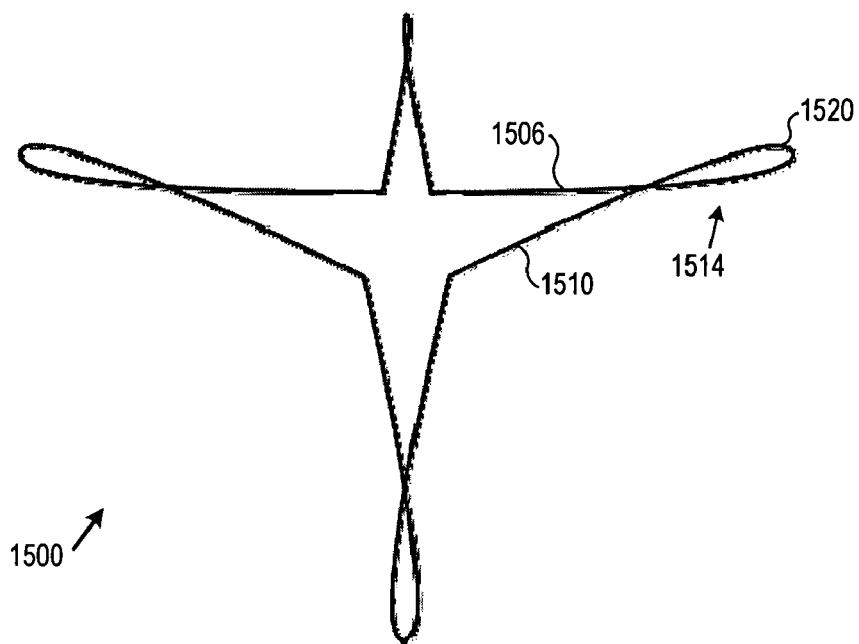

FIG. 15 is a diagram of a star shape 1500 according to various embodiments disclosed herein. The outer roundness value associated with the star shape 1500 is −25%. It can be seen that the sides of the star points (e.g., the sides 1506 and 1510 of the star point 1514) associated with a star shape for which a larger negative outer roundness value is specified cross over each other to form a loop (e.g., the loop 1520) toward the outer radius of the star point 1514. This behavior occurs because the tangents at the outer radius of the two bezier curves comprising the lobe reverse direction as the outer roundness value goes negative.

Figure 16:
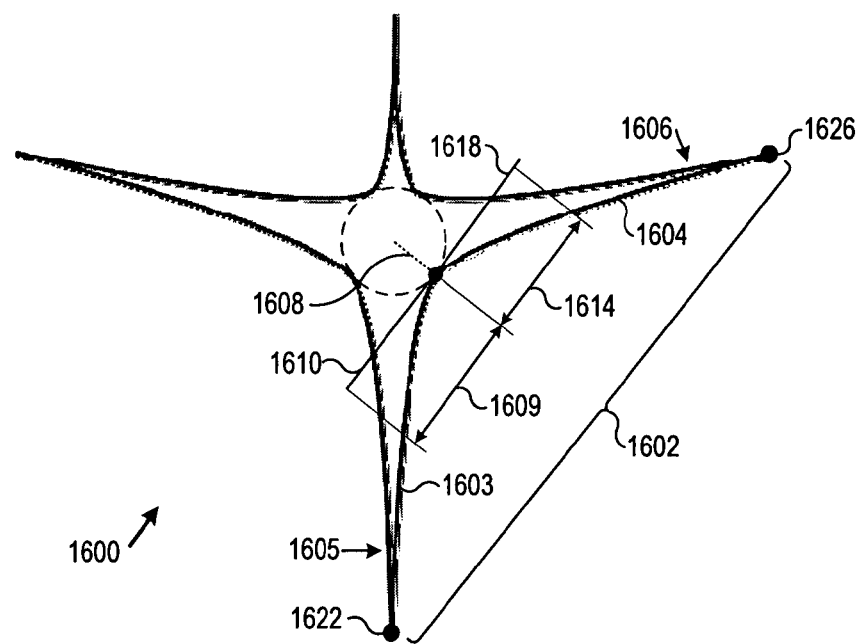

FIG. 16 is a diagram of a star shape 1600 according to various embodiments disclosed herein. The star shape 1600 is rendered with one or more angular shapes 1602 formed by a junction of the bezier curves 1603 and 1604 from two adjacent star points 1605 and 1606, respectively. The shapes of the bezier curves 1603 and 1604 at the inner radius 1608 are defined by the length 1609 of the tangent line 1610 and the length 1614 of the tangent line 1618, respectively. The tangent lengths 1609 and 1614 are proportional to a magnitude of an inner roundness input parameter that may be user-specified.

Thus, the angular shape 1604 becomes more round and open as the tangent lines 1610 and 1618 associated with the adjacent bezier curves 1603 and 1604 elongate in response to an increase in the magnitude of the inner roundness parameter. The star points 1605 and 1606 are not rounded at the outer radius, indicating that the tangents of the bezier curves 1603 and 1604 are of zero length at the outer radius points 1622 and 1626.

Figure 17:
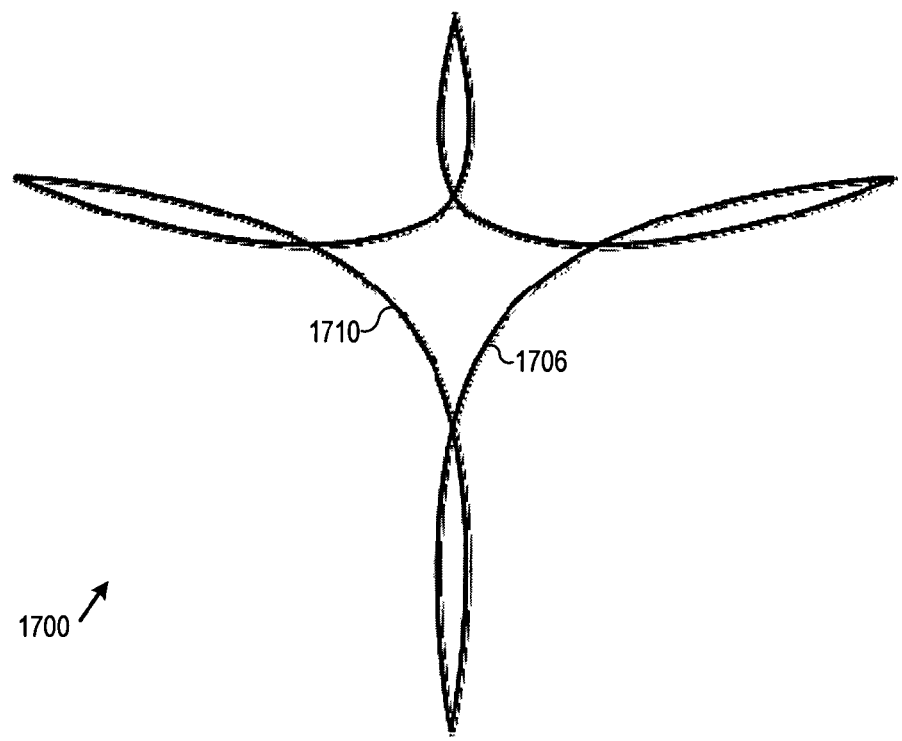

FIG. 17 is a diagram of a star shape 1700 according to various embodiments disclosed herein. The inner roundness value associated with the star shape 1700 is 600%. It can be seen that adjacent bezier curves (e.g., the bezier curves 1706 and 1710) cross over each other as the inner roundness value becomes large.

Figure 18:
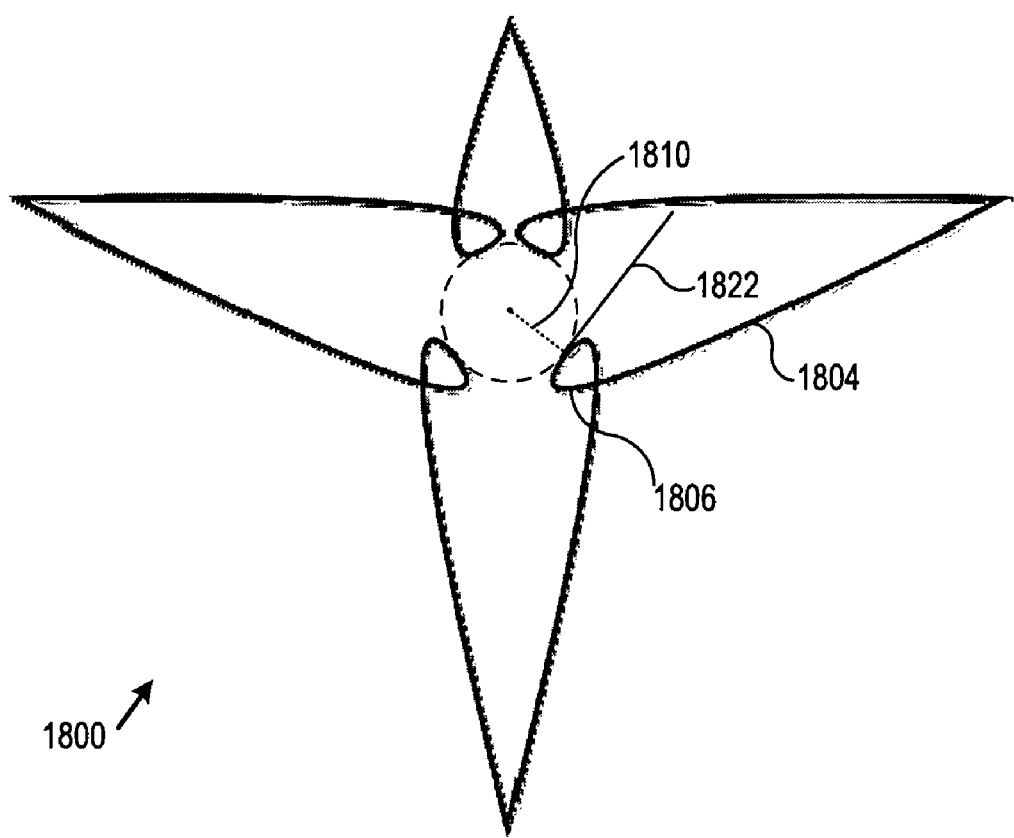

FIG. 18 is a diagram of a star shape 1800 according to various embodiments disclosed herein. The inner roundness value associated with the star shape 1800 is −515%. It can be seen that negative values of inner roundness result in the bezier curve (e.g., the bezier curve 1804 of the star shape 1800) forming into an inner loop (e.g., the inner loop 1806) at the inner radius. This is caused by the tangent line 1822 reversing direction, as previously mentioned.

Figure 19:
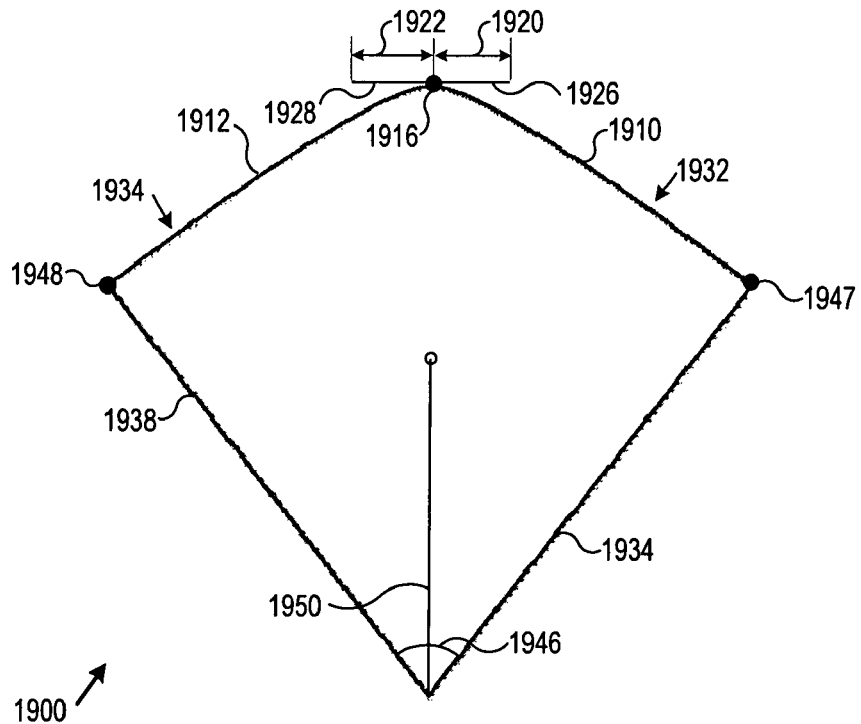
FIGS. 19-26 are diagrams of modified polygon shapes according to various embodiments disclosed herein.

FIG. 19 is a diagram of a modified polygon shape 1900 according to various embodiments disclosed herein. The invented embodiments may render the modified polygon shape 1900 with a total number of sides equal to an integer portion of a non-integer polygon sides input parameter plus one. A number of sides equal to the integer portion of the polygon sides input parameter minus one may be rendered as regular polygon sides. The other two sides may be rendered as adjacent, symmetrical bezier curves (e.g., the bezier curves 1910 and 1912 of the modified polygon shape 1900). In some embodiments, the polygon sides input parameter may be input by a user.

At the vertex 1916, embodiments herein shape the bezier curves 1910 and 1912 according to the lengths 1920 and 1922 of the tangent lines 1926 and 1928, respectively. Longer tangent lines result in less curvature at the vertex 1916, thereby flattening the two symmetrical bezier curves 1910 and 1912. As a result, the two polygon sides 1932 and 1934 begin to appear as a single side as the tangent lines 1926 and 1928 grow longer. Various embodiments adjust the tangent lines 1926 and 1928 in an inversely proportional relationship with the fractional portion of the polygon sides input parameter. The polygon sides input parameter associated with the modified polygon shape 1900 is 3.5.

Angle 1946 is an interior angle of the shape 1900. The size of interior angles of a regular polygon increases as the number of sides of the regular polygon increases. Embodiments herein may therefor adjust an interior angle (e.g., the interior angle 1946) associated with adjacent sides of the modified polygon shape 1900 to be proportional to the fractional portion of the polygon sides input parameter. The net effect of this adjustment is to angularly re-distribute vertices (e.g., the vertices 1947 and 1948) of the modified polygon 1900 to make room for the two sides that are emerging from a single side as the polygon grows from a number of sides equal to the integer portion of the polygon sides input parameter to an number of sides equal to the integer portion of the polygon sides input parameter plus one.

Embodiments herein may adjust a length of a radius 1950 associated with the modified polygon shape 1900 using a radius input parameter. The radius input parameter may be input by a user or may be received from some other system or module.

Figure 20:
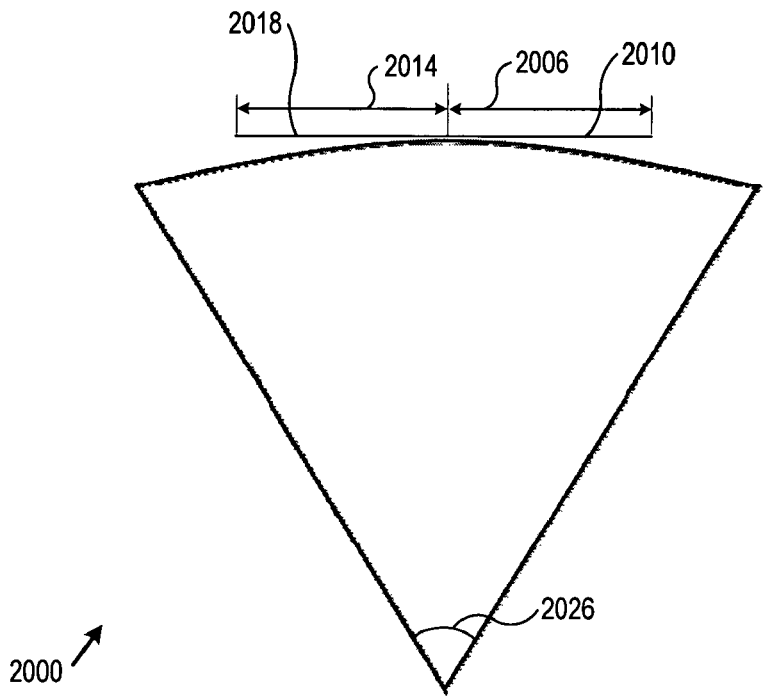

FIG. 20 is a diagram of a modified polygon shape 2000 according to various embodiments disclosed herein. The polygon sides input parameter associated with the modified polygon shape 2000 is 3.1. The reader is invited to note that the length 2006 of the tangent 2010 and the length 2014 of the tangent 2018 are greater than the length 1920 of the tangent 1926 and the length 1922 of the tangent 1928, respectively. The tangent lengths associated with the modified polygon shape 1900 and with the modified polygon shape 2000 are inversely proportional to the fractional portions 0.5 and 0.1 of the polygon sides input parameters 3.5 and 3.1, respectively. It is also noteworthy that the interior angle 2026 is smaller than the interior angle 1946 of the shape 1900. This decrease in the angle 2026 as compared to the angle 1946 is proportional to the decrease in the fractional portion of the polygon sides input parameter from 0.5 to 0.1.

Figure 21:
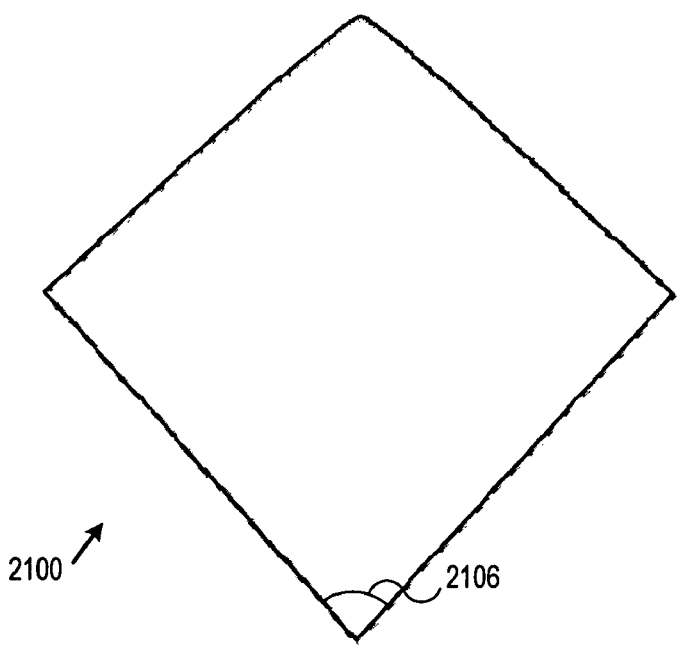

FIG. 21 is a diagram of a modified polygon shape 2100 according to various embodiments disclosed herein. The polygon sides input parameter associated with the modified polygon shape 2100 is 3.8. Viewing the shape 2100 in light of the shapes 1900 and 2000, it can be seen that a modified polygon shape assumes the shape of a regular polygon with a number of sides equal to the next integer number above the polygon sides input parameter as the fractional portion of the polygon sides input parameter gets larger. The interior angle 2106 has increased proportionally with the increase in the fractional portion of the polygon sides input parameter to 0.8 such that the angle 2106 is approaching the quadrilateral interior angle of 90 degrees.

Figure 22:
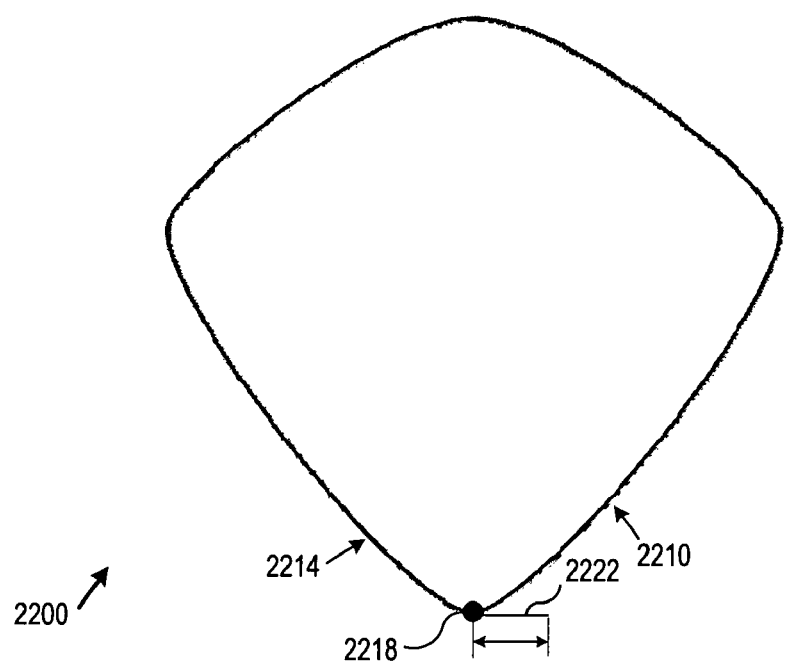

FIG. 22 is a diagram of a modified polygon shape 2200 according to various embodiments disclosed herein. Some embodiments may receive a roundness input parameter and may render the modified polygon shape 2200 as a symmetrical pair of bezier curves (e.g., the bezier curves 2210 and 2214) at one or more vertices (e.g., the vertex 2218). The shape of the curves 2210 and 2214 at the vertex 2218 is controlled by the length of the tangent lines associated with the bezier curves 2210 and 2214 at the vertex 2218. The tangent lengths are in turn controlled by the roundness input parameter. The value of the outer roundness input parameter associated with the modified polygon shape 2200 is 50%.

Figure 23:
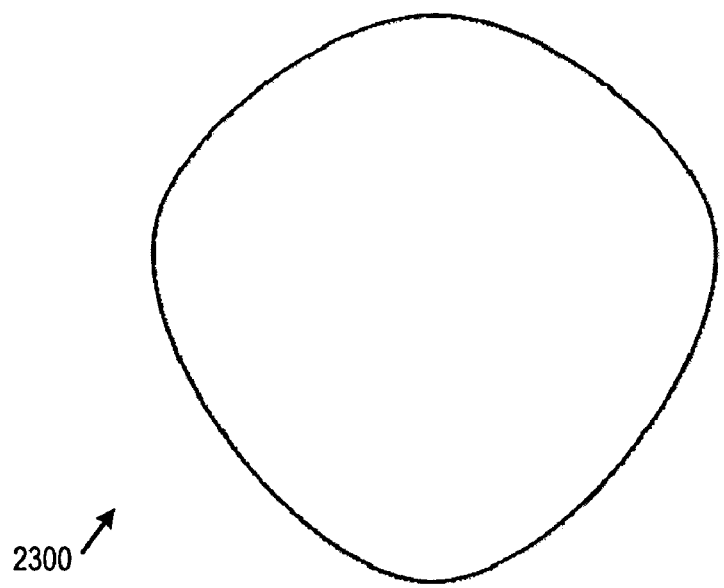

FIG. 23 is a diagram of a modified polygon shape 2300 according to various embodiments disclosed herein. The shape 2300 is rendered using a roundness input parameter value of 100%. It can be seen that the shape of the modified polygon 2300 approaches a circle as the value of the roundness input parameter increases to 100%.

Figure 24:
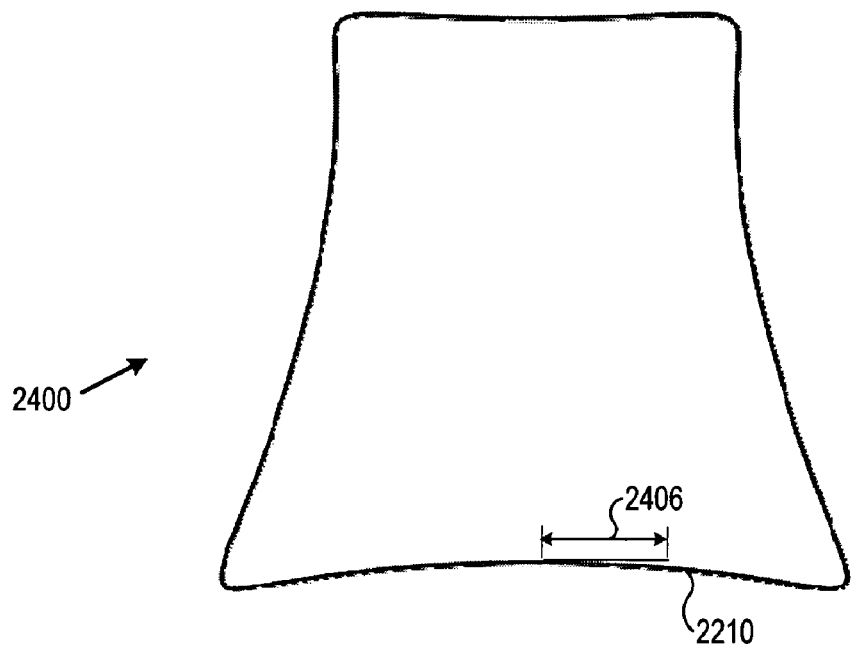

FIG. 24 is a diagram of a modified polygon shape 2400 according to various embodiments disclosed herein. The shape 2400 is rendered using a roundness input parameter value of 450%. It can be seen that the shape of the bezier curve 2210 as described for the shape 2200 transitions from convex in the shape 2200 to concave in the shape 2400 as the roundness input parameter increases from 50% to 450%.

Figure 25:
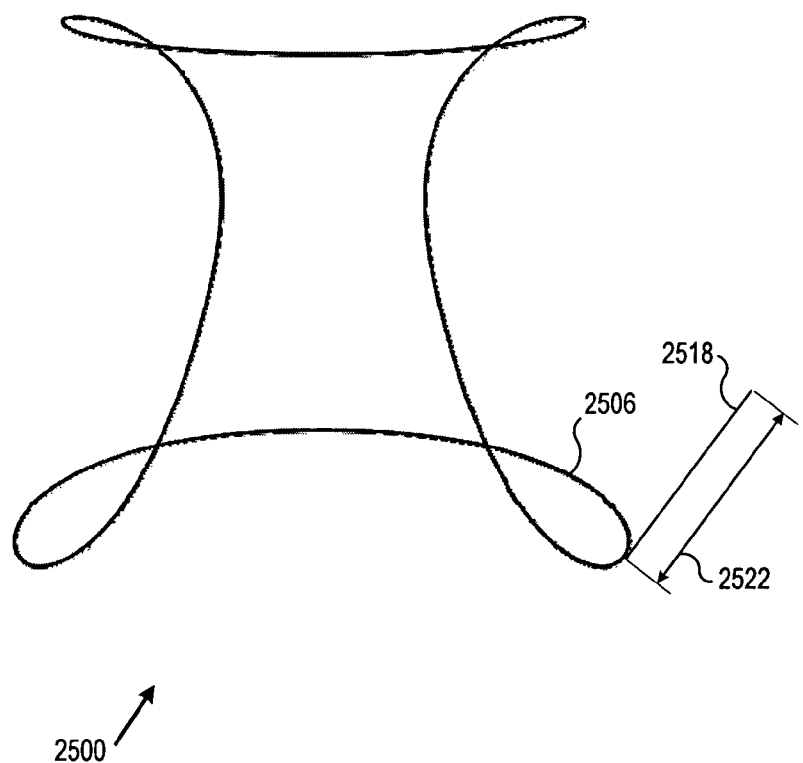

FIG. 25 is a diagram of a modified polygon shape 2500 according to various embodiments disclosed herein. The shape 2500 is rendered using a roundness input parameter value of 1055%. It can be seen that the straight side 1934 of the original modified polygon shape 1900 degenerates to a loop 2506 in the shape 2500 using the roundness input parameter value of 1055%. The loop 2506 may comprise a bezier curve. In the latter case, the tangent 2518 defines the shape of one-half of the loop 2506 as previously described for other bezier curves. Embodiments herein render the length 2522 of the tangent line 2518 proportional to the magnitude of the roundness input parameter.

Figure 26:
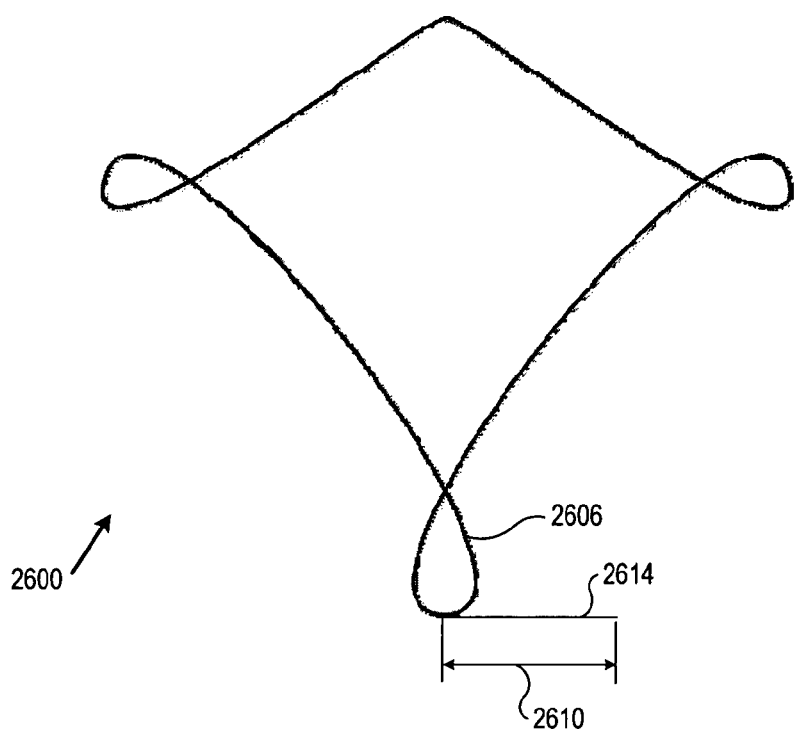

FIG. 26 is a diagram of a modified polygon shape 2600 according to various embodiments disclosed herein. The shape 2600 is rendered using a roundness input parameter value of −50%. It can be seen that the bezier curve 2214 of shape 2200 is rendered as one-half of a loop 2606 in the shape 2600 if the roundness input parameter is negative. The length 2610 of the tangent line 2614 is proportional to the absolute value of the roundness input parameter.

Figure 27:
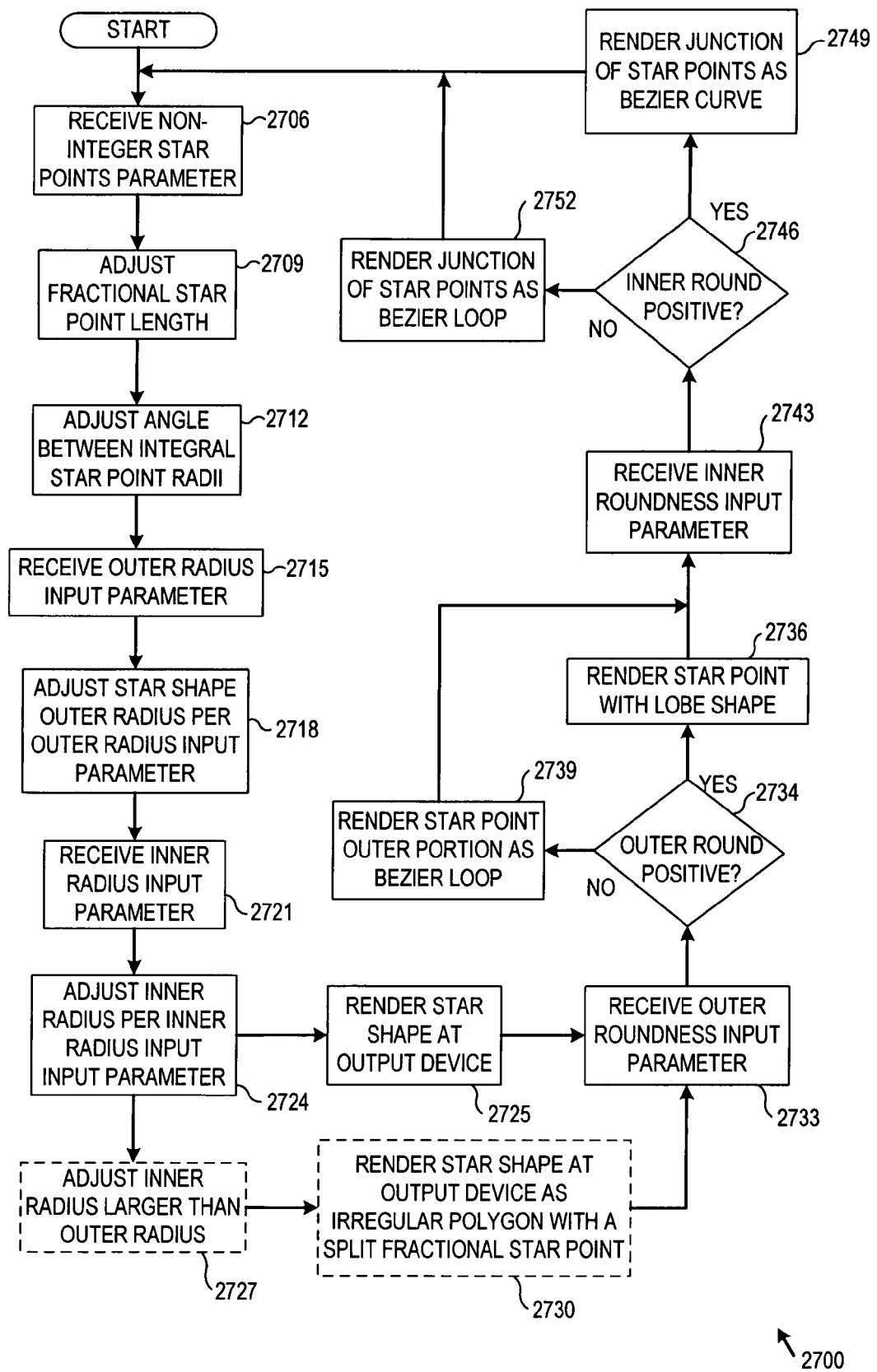
FIGS. 27 and 28 are flow diagrams illustrating several methods according to various embodiments of the invention.

FIG. 27 is a flow diagram illustrating several methods according to various embodiments of the invention. A method 2700 creates star shapes with a non-integer number of star points, stores the shapes, and/or renders the star shapes to an output device. The shapes may be stored in one or more of a memory, a mass storage subsystem, a database, or a distributed computing system.

The method 2700 may commence at block 2706 with receiving a star points input parameter as a non-integer value greater than three. The method 2700 may continue at block 2709 with adjusting a radial length associated with the fractional star point to be proportional to a fractional portion of the star points input parameter. The method 2700 may include adjusting an angle between integral star point radii to be inversely proportional to a fractional portion of the star points input parameter, at block 2712.

The method 2700 may also include receiving an outer radius input parameter, at block 2715. The method 2700 may further include adjusting an outer radius associated with the star shape to be proportional to the outer radius input parameter, at block 2718. The method 2700 may also include receiving an inner radius input parameter, at block 2721. The method 2700 may further include adjusting an inner radius associated with the star shape to be proportional to the inner radius input parameter, at block 2724.

The method 2700 may continue at block 2725 with rendering the star shape at an output device and/or storing the star shape. The star shape may be rendered with a number of star points equal to an integer portion of a non-integer star points input parameter plus one. The single fractional star point may be differentiated from the remaining integer star points by the radial length, as previously mentioned. The angle between the integral star point radii may be inversely proportional to the fractional portion of the star points input parameter in the rendered star shape. The outer radius may be proportional to the outer radius input parameter. The inner radius may be proportional to the inner radius input parameter.

The method 2700 may also include adjusting the inner radius input parameter to be greater than the outer radius input parameter, at block 2727. The method 2700 may further include rendering the star shape as an irregular polygon, wherein the fractional star point is split into two degenerate polygon points, at block 2730.

The method 2760 may continue at block 2733 with receiving an outer roundness input parameter. The method 2700 may determine whether the outer roundness parameter is positive or negative, at block 2734. If positive, the method 2700 may include rendering one or more of the star points as a lobe shape, at block 2736. Embodiments herein may render a width of the star point measured perpendicular to a radius of the star point from a center of the star shape proportional to a magnitude of the outer roundness input parameter.

In some embodiments, the lobe shape may comprise a pair of bezier curves symmetrical about a radial lobe axis. Each of the bezier curves may be defined by the lengths of two tangent lines, one at the inner radius and one at the outer radius. If the outer roundness input parameter is negative, the method 2700 may include rendering the outer portion of the star point as a bezier loop, at block 2739. The lengths of two tangent lines, one associated with each of two symmetrical halves of the bezier loop at the outer radius, are proportional to the absolute value of the outer roundness input parameter.

The method 2700 may continue at block 2743 with receiving an inner roundness input parameter. The method 2700 may determine whether the value of the inner roundness parameter is positive or negative, at block 2746. If positive, the method 2700 may include rendering one or more angular shapes formed by a junction of two bezier curves associated with adjacent star points, at block 2749.

Each bezier curve is defined by two lines tangent to the bezier curve at inner and outer radii, as previously described. The lengths of two tangent lines, one associated with each of two symmetrical halves of the bezier loop at the inner radius, are proportional to the absolute value of the inner roundness input parameter. If the inner roundness input parameter is negative, the junction of the two star points may be rendered as a bezier loop, at block 2752. The breadth of the bezier loop is proportional to the absolute value of the inner roundness input parameter.

Figure 28:
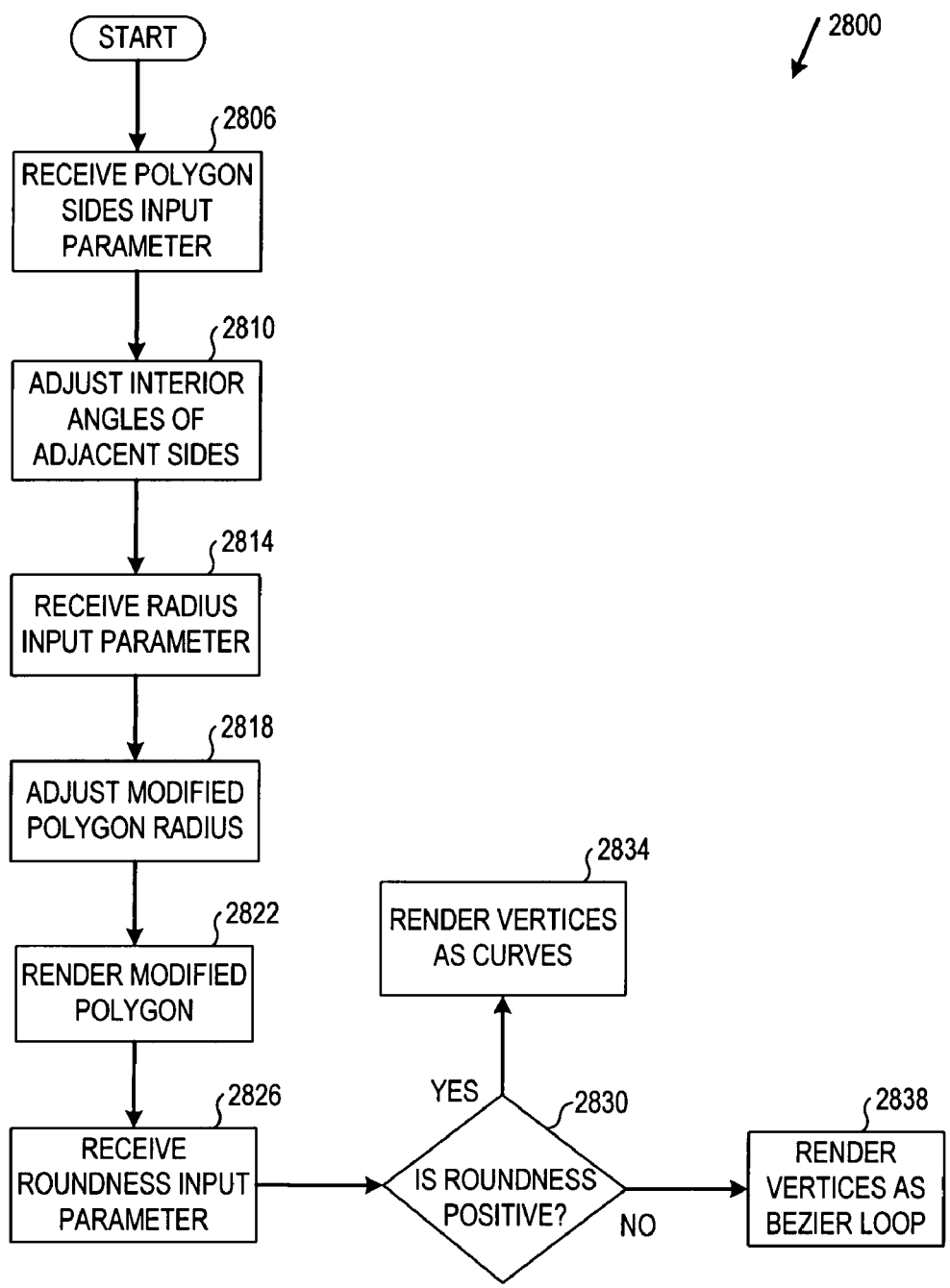

FIG. 28 is a flow diagram illustrating several methods according to various embodiments of the invention. A method 2800 renders modified polygon shapes to simulate a non-integer number of sides. Some embodiments may render the modified polygon shape 1900 with a total number of sides equal to an integer portion of a non-integer polygon sides input parameter plus one. A number of sides equal to the integer portion of the polygon sides parameter minus one may be rendered as regular polygon sides. The other two sides may be rendered as adjacent, symmetrical bezier curves, as previously described.

The method 2800 may commence at block 2806 with receiving a polygon sides input parameter as a non-integer value greater than three. The method 2800 may continue at block 2810 with adjusting an interior angle associated with adjacent sides of a modified polygon to be proportional to the fractional portion of the polygon sides input parameter. The method 2800 may include receiving a radius input parameter, at block 2814. The method may also include adjusting the radius of the modified polygon shape to be proportional to the radius input parameter, at block 2818.

The method 2800 may further include rendering the modified polygon shape at an output device and/or storing the modified polygon shape, at block 2822. The shapes may be stored in one or more of a memory, a mass storage subsystem, a database, or a distributed computing system.

Embodiments herein may render the modified polygon shape with a number of sides equal to an integer portion of a non-integer polygon sides input parameter plus one. A number of sides equal to the integer portion of the polygon sides parameter minus one may be rendered as regular polygon sides. The other two sides may be rendered as adjacent, symmetrical bezier curves, as previously described.

The method 2800 may include shaping the symmetrical bezier curves according to the lengths of two tangent lines, one associated with each of the symmetrical bezier curves. Each of the two tangent lines extends from a vertex of the modified polygon shape and is inversely proportional to the fractional portion of the polygon sides input parameter.

The method 2800 may continue at block 2826 with receiving a roundness input parameter. The method 2800 may include determining whether the value of the roundness input parameter is positive or negative, at block 2830. If the roundness input parameter is positive, the method 2800 may include rendering one or more vertices of the modified polygon as a curve, at block 2834. The shape of the curve may be determined by the roundness input parameter. The curve may comprise a pair of symmetrical bezier curve segments, as previously described.

Lengths of tangent lines associated with the each of the bezier segments are proportional to the roundness input parameter. If the roundness input parameter is negative, the method 2800 may conclude at block 2838 with rendering the vertex as a bezier loop. In the latter case, the lengths of the tangent lines are proportional to the absolute value of the roundness input parameter.

The activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Methods disclosed herein may be implemented with the following example C code:

```
void   CreatePolyStar(PolyStarType poly_star_type,
       M_Float pointsF,
const  M_Vector2 posFPt,
       M_Float rot_zF,
       M_Float in_radF,
       M_Float out_radF,
       M_Float in_roundF,
       M_Float out_roundF,
       const RG_ProgAbort *rg_abortP0,
       PathData &result_path)
{
// The ceiling function returns the next highest integer that is
// equal to, or larger than the floating point number of points.
    long num_ptsL = static_cast<long>(ceil(pointsF));
// When computing the angle using cosine and sine, start at the input rotation
// angle, and add 90 degrees (half pi) to offset the starting point from the right
// to the top.
    double thetaF = M_HALF_PI - rot zF*M_RAD_PER_DEGREE;
// start at the top
// This variable is used to make and incremental angle change per point in the iteration.
    double theta_incF = - M_PI/pointsF;
// This variable is used to scale the fractional point, and neighboring vertices
// if the point is a partial size. If integer number of points (num_ptsL) is equal
// to the fractional number of points (pointsF), then the scale will be 1, and it
// will treat the point as any other point.
    double goal_scaleF = 1 - (num_ptsL - pointsF);
// This variable is used for conditionals that need to determine if we are creating
// a polygon, as opposed to a star.
    bool polyB = poly_star_type == PolyStarType_POLYGON;
// These variables are used to determine the goal for the radius and tangent
// sizes. The goal is the size of the radius or tangent if it were of non-fractional
// size. The goal_scaleF variable is used to scale the sizes of the radius and
// tangents based on its fractional size.
    double rad_goalF = 0, tan_goalF = 0, next_tan_goalF = 0;
    if (polyB) {
// Since this is a polygon, calculate the radius and tangent goals by creating the
// curve that defines the non-fractional sizes, and use its mid distance from the
// center as the radius goal. Use the length of the tangents after splitting
// the curve as the tangent and next tangent goals.
    BEZ_Curve2 bez_curve;
// cosine and sine of the angle between any 2 points relative to the center.
    M_Float cosF = cos(theta_incF), sinF = sin(theta_incF);
// same as above, but in the opposite direction.
    M_Float neg_cosF = cos(-theta_incF), neg_sinF = sin(-theta_incF);
// First point of the curve to split
    bez_curve[0] = M_Vector2(out_radF * cosF, out_radF * sinF);
// Last point of the curve to split
    bez_curve[3] = M_Vector2(out_radF * neg_cosF, out_radF * neg_sinF);
// The size of the tangent based on the roundness setting.
//BEEp_BEZ_ELLIPSE_HANDLE_SCALE is defined
// as the size of a tangent relative to the radius to define a circle with a bezier.
    M_Float round_amountF = out_roundF * BEEp_BEZ_ELLIPSE_HANDLE_SCALE
        * out_radF * sin (theta_incF);
// Define the tangents relative to the desired size, then add the corresponding point to
// make them relative.
    bez_curve[1] = M_Vector2(round_amountF * sinF, round_amountF * -cosF);
    bez_curve[2] = M_Vector2(round_amountF * -neg_sinF, round_amountF *
        neg_cosF);
    bez_curve[1] += bez_curve[0];
    bez_curve[2] += bez_curve[3];
// The results of the split
    BEZ_Curve2   split1, split2;
// Split the curve.
    BEZ_SubdivideCurve(bez_curve, 0.5, &split1, &split2);
// Update the radius goal as the x position of the split point.
    rad_goalF = split1[3].x;
// Tangent goal, is computed by the length of the and direction
// of the mid point incoming tangent.
    M_Vector2 diff1FPt(split1[2] - split1[3]);
    M_Float dot1F =M_Sgn(split2[3].Dot(diff1FPt));
    tan_goalF = diff1FPt. Length( ) * dot1F;
// Next tangent goal, is computed by the length of the and direction
// of the first point outgoing tangent.
    M_Vector2 diff2FPt(split1[0] - split1[1]);
    M_Float dot2F = M_Sgn(split2[3].Dot(diff2FPt));
```

```
            next_tan_goalF = diff2FPt.Length( ) * dot2F;
    } else {
// For a star, the radius goal is simply the minimum of the inner and outer radius.
            rad_goalF = std::min(out_radF, in_radF);
            }
            if (polyB) {
// For a polygon, the inner radius and roundness are not used.
            in_radF = 0;
            in_roundF = 0;
    }
// These variables are used to retain the location of the first point, and the
// size of the first and last tangent.
            M_Vector2 first_pointFPt, first_tanFPt, last_tanFPt;
// These variables are used to retain the location of the previous point, and the
// size of the previous tangent.
            M_Vector2 prev_pointFPt, prev_tanFPt;
// We iterate for each number of points, twice.
// For stars, that creates a curve point for each inner and outer point.
// For polygons, we skip the inner points.
            for (long i = 0; i <num_ptsL * 2; ++i) {
                    bool outB = ((i & 1) == 0);
// Skip the inner point for polygons.
                    if (!polyB || outB) {
// The current point and tangent length.
                            M_Vector2 pointFPt, tanFPt;
// The current radius (inner or outer).
                            M_Float this_radF = outB ? out_radF : in_radF;
// This roundness value (inner or outer)
                            M_Float this_roundF = outB ? out_roundF : in_roundF;
// This roundness length based on the distance between points and the bezier tangent
// size to approximate a circle when roundess is 1.
                            M_Float this_round_amountF = this_roundF *
                            BEEp_BEZ_ELLIPSE_HANDLE_SCALE * sin (theta_incF);
// If it is the first point, scale it based on the partial scaling factor.
                            if (i == 0) {
                                    this_radF = M_Lerp(rad_goalF, this_radF, goal_scaleF);
                                    thetaF += M_Lerp(theta_incF, 0.0, goal_scaleF);
                            }
// This tangent is computed multiplying this round amount by this radius.
                            M_Float this_tanF = this_round_amountF * this_radF;
// Cosine and Sine of this theta angle.
                            M_Float cosF = cos(thetaF), sinF = sin(thetaF);
// The location of the point and tangent for this theta angle.
                            pointFPt.x = posFPt.x + this_radF * cosF;
                            pointFPt.y = posFPt.y - this_radF * sinF;
                            tanFPt.x = this_tanF * sinF;
                            tanFPt.y = this_tanF * cosF;
// Compute the scaled point and tangents.
                            M_Vector2 scaled_tanFPt(tanFPt);
                            if (!polyB && i == 0) {
// Star, first point
                                    scaled_tanFPt *= goal_scaleF;
                            } else if (polyB && i == 0) {
// Polygon, first point
                                    this_tanF = M_Lerp(tan_goalF, this_tanF, goal_scaleF);
                                    scaled_tanFPt.x = this_tanF * sinF;
                                    scaled_tanFPt.y = this_tanF * cosF;
                            } else if (!polyB && i == 1) {
// Star, next point
                                    scaled_tanFPt *= goal_scaleF;
                            } else if (polyB && i == 2) {
// Polygon, next point
                                    this_tanF = M_Lerp(next_tan_goalF, this_tanF,
                                    goal_scaleF);
                                    scaled_tanFPt.x = tanF * sinF;
                                    scaled_tanFPt,y = this_tanF * cosF;
                            } else if (!polyB && i + 1 == num_ptsL * 2) {
// Star, last point
                                    last_tanFPt = tanFPt;
                                    last_tanFPt *= goal_scaleF;
                            } else if (polyB && i+2 == num_ptsL * 2) {
// Polygon, last point
                                    this_tanF = M_Lerp(next_tan_goalF, this_tanF,
                                    goal_scaleF);
                                    tanFPt.x = this_tanF * sinF;
                                    tanFPt.y = this_tanF * cosF;
                                    last_tanFPt = tanFPt;
                            }
                            if (i == 0) {
```

-continued

```
// In our path defintion, the first point has to be defined using this function called
// MoveTo that moves the pen to a given location.
                    result_path.MoveTo(pointFPt.x, pointFPt.y);
                    first_pointFPt = pointFPt;
                    first_tanFPt = scaled_tanFPt;
                    tanFPt = scaled_tanFPt;
                } else {
// In our path defintion, this CurveTo function defines how to construct the next 3 points
// from the previous MoveTo, or the last point of the previous CurveTo.
                    result_path.CurveTo(prev_pointFPt.x - prev_tanFPt.x,
                        prev_pointFPt.y - prev_tanFPt.y,
                        pointFPt.x + scaled_tanFPt.x,
                        pointFPt.y + scaled_tanFPt.y,
                        pointFPt.x,
                        pointFPt.y);
                }
// Retain the previous point and tangent to be used next time in the iteration.
                prev_pointFPt = pointFPt;
                prev_tanFPt = tanFPt;
            }
// If this is the first point, modifiy the current angle the partial size of the first point.
// Otherwise, increment it by the full amount.
            if (i == 0) {
                thetaF += M_Lerp(0.0, theta_incF, goal_scaleF);
            } else {
                thetaF += theta_incF;
            }
            if (rg_abortP0) rg_abortP0->CheckAbort( );
        }
// Complete the path by defining the curve back to the first point.
        result_path.CurveTo(prev_pointFPt.x - last_tanFPt.x,
            prev_pointFPt.y - last_tanFPt.y,
            first_pointFPt.x + first_tanFPt.x,
            first_pointFPt.y + first_tanFPt.y,
            first_pointFPt.x,
            first_pointFPt.y);
// Mark the path as closed.
        result_path.ClosePath( );
    }
```

Figure 29:
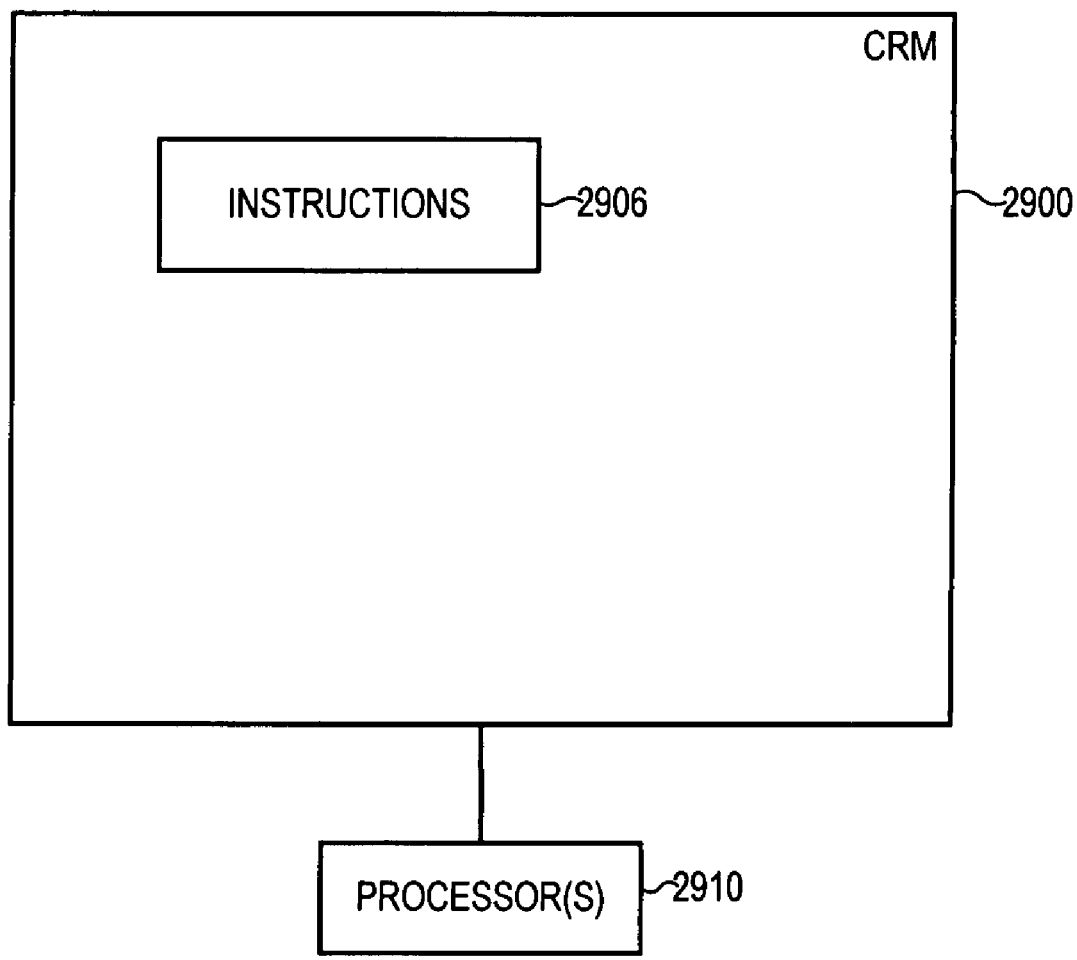
FIG. 29 is a block diagram of a computer readable medium (CRM) according to various embodiments.

FIG. 29 is a block diagram of a CRM 2900 according to various embodiments. Examples of such embodiments may comprise a memory system, a magnetic or optical disk, or some other storage device. The CRM 2900 may contain instructions 2906 which, when accessed, result in one or more processors 2910 performing any of the activities previously described, including those discussed with respect to the methods 2700 and 2800 noted above.

Figure 30:
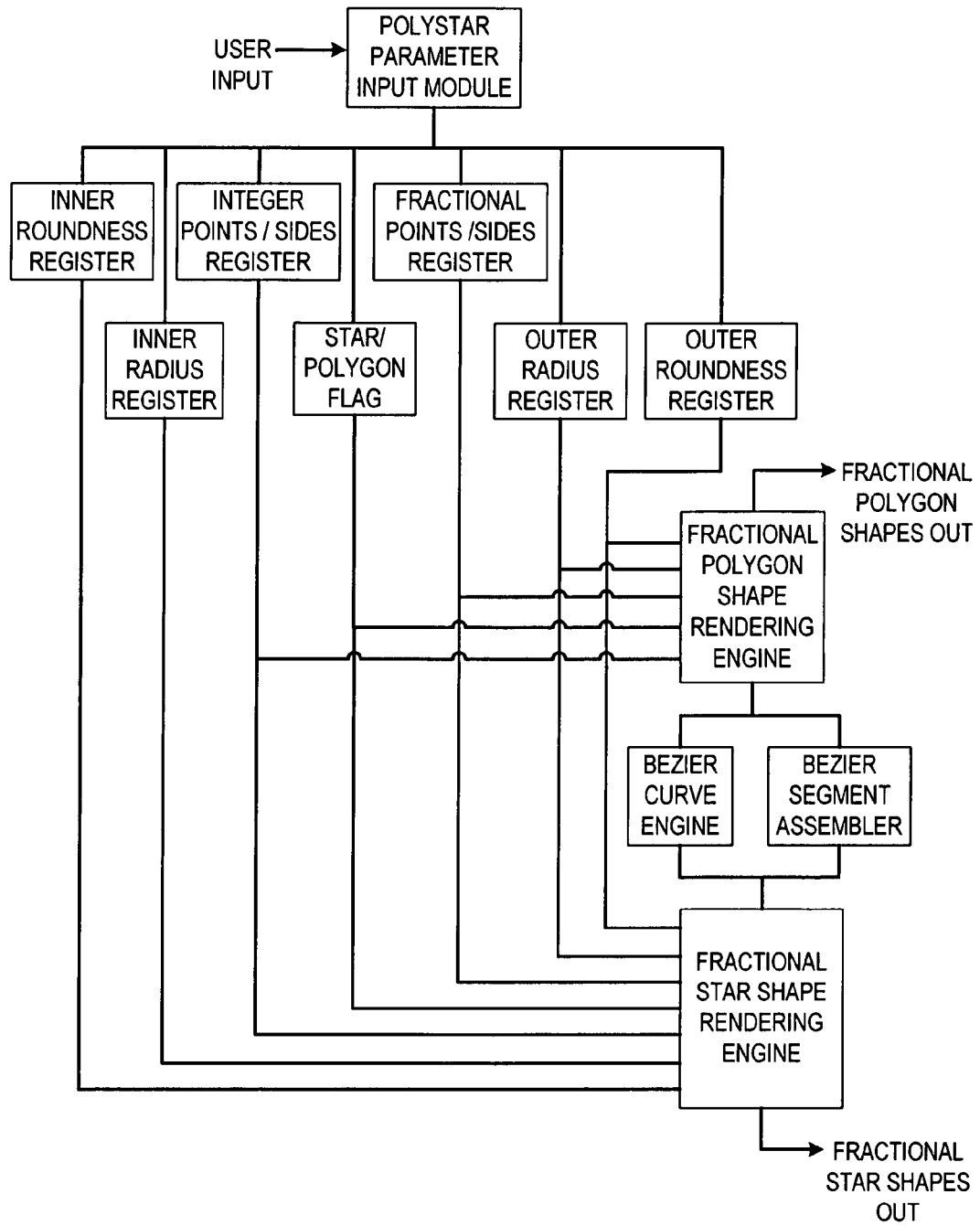
FIG. 30 is a block diagram of an apparatus according to various embodiments.

FIG. 30 is a block diagram of an apparatus 3000 according to various embodiments. The apparatus 3000 may include a bezier curve engine 3006 to calculate a plurality of points along a bezier segment. The apparatus 3000 may also include a bezier segment assembler 3010 coupled to the bezier curve engine 3006. The bezier segment assembler 3010 splices together a plurality of bezier curves pursuant to a fractional polystar shape creation operation.

The apparatus 3000 may also include a fractional star shape rendering engine 3014 coupled to the bezier segment assembler 3010. The fractional star shape rendering engine 3014 renders a fractional star shape with a number of star points equal to an integer portion of a non-integer star points input parameter plus one. A fractional star point is differentiated from integer star points by a radial length.

The apparatus 3000 may also include a fractional polygon shape rendering engine 3018 coupled to the bezier segment assembler 3010. The fractional polygon shape rendering engine 3018 renders a modified polygon shape. The modified polygon shape has a total number of sides equal to an integer portion of a non-integer polygon sides input parameter plus one. The sides are of two types. A regular number of sides equal to the integer portion of the polygon sides parameter minus one are rendered as regular polygon sides. Two sides are rendered as adjacent symmetrical bezier curves. Each of the bezier curves is shaped by a length of a line tangent to the bezier curve at a vertex of the modified polygon shape. Each of the two lines tangent is inversely proportional to the fractional portion of the polygon sides input parameter.

The apparatus 3000 may also include a set of registers 3024 coupled to the fractional polygon shape rendering engine 3018, to the fractional star shape rendering engine 3014, or to both to store a set of input parameter values. The input parameter values may include one or more of a star-polygon flag, an integer points-sides parameter value, a fractional points-sides parameter value, an outer radius value, an inner radius value, an outer roundness parameter value, and an inner roundness value.

The apparatus 3000 may also include a polystar parameter input module 3028. The polystar parameter input module 3028 accepts the set of input parameter values and stores them in the set of registers 3024.

The apparatus 3000 may perform any of the methods and activities previously described. Any of the components previously described may be implemented in a number of ways, including embodiments in software. Software embodiments may be used in a simulation system, and the output of such a system may provide operational parameters to be used by the various apparatus described herein.

Thus, the apparatus 3000, the bezier curve engine 3006, the bezier segment assembler 3010, the fractional star shape rendering engine 3014, the fractional polygon shape rendering engine 3018, the set of registers 3024, and the polystar parameter input module 3028 may all be characterized as "modules," "logic," or "engines" herein.

The modules may include hardware circuitry, optical components, single or multi-processor circuits, memory circuits, software program modules and objects, firmware, and combinations thereof, as desired by the architect of the apparatus 3000 and as appropriate for particular implementations of various embodiments.

The apparatus of various embodiments may be useful in applications other than rendering fractional star and polygon primitives in response to parametric user input. Thus, various embodiments of the invention are not to be so limited. The illustration of the apparatus 3000 is intended to provide a general understanding of the structure of various embodiments. It is not intended to serve as a complete or otherwise limiting description of all the elements and features of apparatus and systems that might make use of the structures described herein.

The novel apparatus and systems of various embodiments may comprise and/or be included in electronic circuitry used in computers, communication and signal processing circuitry, single-processor or multi-processor modules, single or multiple embedded processors, multi-core processors, data switches, and application-specific modules including multi-layer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The methods and apparatus disclosed herein create and render star shape and polygon graphics primitives, including fractional star shapes and fractional modified polygons. The shapes may be stored and/or rendered to an output device. The shapes are rendered parametrically according to a specified non-integer star points parameter and a non-integer polygon sides parameter, respectively, radii parameters and roundness parameters. The resulting graphics primitives are useful to graphics designers as stand-alone shapes and as building blocks for assembling more complex graphic designs.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, comprising:

receiving, at a processor-implemented parameter input module, a star points input parameter as a non-integer value greater than three; and rendering, with a processor-implemented star shape rendering engine, a star shape with a number of star points equal to an integer portion of the star points input parameter plus one, a fractional one of the star points being differentiated from integer ones of the star points by a radial length.

2. The method of claim 1, further comprising:

storing the star shape in at least one of a memory, a mass storage subsystem, a database, or a distributed computing system.

3. The method of claim 1, further comprising:

shaping each of a plurality of symmetrical bezier segment pairs according to at least one of a first line tangent to each bezier segment at an inner radius of the star shape or a second line tangent to the bezier segment at an outer radius of the star shape; and assembling the star shape from the plurality of symmetrical bezier segment pairs.

4. The method of claim 1, wherein the bezier segment comprises at least one of a linear bezier curve, a quadratic bezier curve, a cubic bezier curve, a B-spline, or a non-uniform rational B-spline (NURBS).

5. The method of claim 1, further comprising:

adjusting a radial length associated with the fractional star point to be proportional to a fractional portion of the star points input parameter.

6. The method of claim 1, further comprising:

adjusting an angle between integral star point radii to be inversely proportional to a fractional portion of the star points input parameter.

7. The method of claim 1, further comprising:

receiving an outer radius input parameter; and adjusting an outer radius associated with the star shape to be proportional to the outer radius input parameter.

8. The method of claim 7, further comprising:

receiving an inner radius input parameter; and adjusting an inner radius associated with the star shape to be proportional to the inner radius input parameter.

9. The method of claim 8, further comprising:

adjusting the inner radius input parameter to be greater than the outer radius input parameter; and rendering the star shape as an irregular polygon, wherein the fractional star point is split into two degenerate polygon points.

10. The method of claim 1, further comprising:
receiving an outer roundness input parameter;
determining whether the outer roundness input parameter is positive or negative; and
rendering at least one of the star points as a lobe shape if the outer roundness parameter is positive, wherein a width of the at least one star point measured perpendicular to a radius of the at least one star point is proportional to a magnitude of the outer roundness input parameter.

11. The method of claim 10, wherein the lobe shape comprises a bezier curve, the bezier curve shaped according to a length of a first line tangent to the bezier curve at an inner radius and a length of a second line tangent to the bezier curve at an outer radius, wherein a length of the first line and a length of the second line are proportional to the outer roundness input parameter.

12. The method of claim 11, further comprising:
rendering the star point as a loop if the outer roundness input parameter is negative, the length of the first line and the length of the second line proportional to the absolute value of the outer roundness input parameter.

13. The method of claim 1, further comprising:
receiving an inner roundness input parameter;
determining whether the inner roundness input parameter is positive or negative; and
rendering at least one angular shape formed by a junction of two bezier curves, each of the two bezier curves associated with an adjacent star point, each of the bezier curves shaped by a length of a line tangent to the bezier curve at the inner radius, wherein a length of each of the lines tangent is proportional to the inner roundness input parameter.

14. The method of claim 13, further comprising:
rendering the at least one angular shape as a bezier loop comprising two bezier curve segments if the inner roundness input parameter is negative, wherein the length of each of the lines tangent is proportional to the absolute value of the inner roundness input parameter.

15. A method, comprising:
receiving, at a processor-implemented parameter input module, a polygon sides input parameter as a non-integer value greater than three; and
rendering, with a processor-implemented polygon shape rendering engine, a modified polygon shape with a total number of sides equal to an integer portion of the polygon sides input parameter plus one, a regular number of sides equal to the integer portion of the polygon sides parameter minus one rendered as regular polygon sides and two sides rendered as adjacent symmetrical bezier curves, each of the bezier curves shaped by a length of a line tangent to the bezier curve at a vertex of the modified polygon shape, wherein each of the two lines tangent is inversely proportional to the fractional portion of the polygon sides input parameter.

16. The method of claim 15, wherein the bezier segment comprises at least one of a quadratic bezier curve or a cubic bezier curve.

17. The method of claim 15, further comprising:
adjusting an interior angle associated with adjacent sides of the modified polygon to be proportional to the fractional portion of the polygon sides input parameter.

18. The method of claim 15, further comprising:
receiving a radius input parameter; and
adjusting a radius associated with the modified polygon shape to be proportional to the radius input parameter.

19. The method of claim 15, further comprising:
receiving a roundness input parameter value;
determining whether the roundness input parameter value is positive or negative; and
rendering at least one of the vertices of the modified polygon as a curve if the roundness input parameter value is positive, wherein a shape of the curve is determined by the roundness input parameter.

20. The method of claim 19, wherein the curve comprises a pair of bezier curves, each of the pair shaped by a length of a line tangent to one of the pair of bezier curves at a vertex of the modified polygon shape, wherein the length of the line tangent is proportional to the fractional portion of the polygon sides input parameter.

21. The method of claim 20, further comprising:
rendering the pair of bezier curves as a loop if the roundness input parameter is negative, wherein the length of the line tangent is proportional to the absolute value of the roundness input parameter.

22. The method of claim 15, further comprising:
shaping each of a plurality of symmetrical bezier segment pairs according to at least one of a first line tangent to each bezier segment at an inner radius of the star shape or a second line tangent to the bezier segment at an outer radius of the star shape; and
assembling the star shape from the plurality of symmetrical bezier segment pairs.

23. A non-transitory computer-readable medium having instructions, wherein the instructions, when executed, result in at least one processor performing:
receiving a star points input parameter as a non-integer value greater than three; and
rendering a star shape with a number of star points equal to an integer portion of the star points input parameter plus one, a fractional one of the star points being differentiated from integer ones of the star points by a radial length.

24. The computer-readable medium of claim 23, wherein the instructions, when executed, result in the at least one processor performing:
adjusting a radial length associated with the fractional star point to be proportional to a fractional portion of the star points input parameter; and
adjusting an angle between integral star point radii to be inversely proportional to the fractional portion of the star points input parameter.

25. A non-transitory computer-readable medium having instructions, wherein the instructions, when executed, result in at least one processor performing:
receiving a polygon sides input parameter as a non-integer value greater than three; and
rendering a modified polygon shape with a total number of sides equal to an integer portion of the polygon sides input parameter plus one, a regular number of sides equal to the integer portion of the polygon sides input parameter minus one rendered as regular polygon sides and two sides rendered as adjacent symmetrical bezier curves, each of the bezier curves shaped by a length of a line tangent to the bezier curve at a vertex of the modified polygon shape, wherein each of the two lines tangent is inversely proportional to the fractional portion of the polygon sides input parameter.

26. The computer-readable medium of claim 25, wherein the instructions, when executed, result in the at least one processor performing:

adjusting an interior angle associated with adjacent sides of the modified polygon to be proportional to the fractional portion of the polygon sides input parameter; receiving a radius input parameter; and adjusting a radius associated with the modified polygon shape to be proportional to the radius input parameter.

27. An apparatus, comprising:

a bezier curve engine to calculate a plurality of points along a bezier segment;

a bezier segment assembler coupled to the bezier curve engine to splice together a plurality of bezier curves; and a fractional star shape rendering engine coupled to the bezier segment assembler to render a star shape with a number of star points equal to an integer portion of a non-integer star points input parameter plus one, a fractional one of the star points being differentiated from integer ones of the star points by a radial length.

28. The apparatus of claim 27, further comprising:

a fractional polygon shape rendering engine coupled to the bezier segment assembler to render a modified polygon shape with a total number of sides equal to an integer portion of a non-integer polygon sides input parameter plus one, a regular number of sides equal to the integer portion of the polygon sides parameter minus one rendered as regular polygon sides and two sides rendered as adjacent symmetrical bezier curves, each of the bezier curves shaped by a length of a line tangent to the bezier curve at a vertex of the modified polygon shape, wherein each of two lines tangent is inversely proportional to the fractional portion of the polygon sides input parameter.

29. The apparatus of claim 28, further comprising:

a set of registers coupled to at least one of the fractional polygon shape rendering engine or the fractional star shape rendering engine to store a set of input parameter values including at least one of a star-polygon flag, an integer points-sides parameter value, a fractional points-sides parameter value, an outer radius value, an inner radius value, an outer roundness parameter value, and an inner roundness value.

30. The apparatus of claim 29, further comprising:

a polystar parameter input module to accept the set of input parameter values and to store the input parameter values in the set of registers.

\* \* \* \* \*